United States Patent [19]

Ishihara et al.

[11] Patent Number: 6,091,513
[45] Date of Patent: Jul. 18, 2000

[54] APPARATUS AND METHOD FOR CONVERTING IMAGE SIZE AND RECORDING MEDIUM RECORDING IMAGE SIZE CONVERTING PROGRAM THEREIN AND CAPABLE OF BEING READ BY COMPUTER

[75] Inventors: Kouki Ishihara; Takamitsu Aoki; Kouji Maeda; Masayuki Horii; Keizou Ueno; Akihisa Sota; Kazuhiro Tamada; Eiichi Ebihara; Hiroshi Yoshimura; Hiroyuki Kaneda; Shigeyoshi Nakamura, all of Kawasaki, Japan

[73] Assignee: Fujitsu Limited, Kawasaki, Japan

[21] Appl. No.: 09/058,133

[22] Filed: Apr. 10, 1998

[30] Foreign Application Priority Data

Nov. 27, 1997 [JP] Japan ..................................... 9-325840

[51] Int. Cl.⁷ ...................................................... G06F 15/00
[52] U.S. Cl. ............................................ 358/1.9; 358/1.18
[58] Field of Search ........................... 395/109; 358/1.11, 358/1.17, 1.18, 464, 448, 1.9, 504, 523, 524, 525, 528, 533, 537, 538, 539, 540, 428, 449, 452, 463, 467; 382/276, 300

[56] References Cited

U.S. PATENT DOCUMENTS 4,841,377  6/1989  Hiratsuka et al. ..................... 358/283
5,724,153  3/1998  Kotani et al. ......................... 358/298
5,870,174  2/1999  Iwasa et al. ........................... 355/27
5,903,317  7/1999  Sharir et al. .......................... 348/589
5,907,640  5/1999  Delean .................................. 382/276
5,930,007  7/1999  Kojima .................................. 358/464

FOREIGN PATENT DOCUMENTS 3-3081  1/1991  Japan ............................... G06F 15/66

Primary Examiner—Dov Popovici
Assistant Examiner—Douglas Tran
Attorney, Agent, or Firm—Staas & Halsey LLP

[57] ABSTRACT

A process discriminating unit allows an optimum converting process among a first magnification processing unit, a second magnification processing unit, a first reduction processing unit, a second reduction processing unit, and a third reduction processing unit to be executed on the basis of a conversion magnification (K), a resolution (D), and an image size. Particularly, each of the second magnification processing unit, first reduction processing unit, and second reduction processing unit magnifies an original image to a virtual image of a dot size obtained by magnifying a target image by 2 or 4 by an interpolation based on a simple repetition by a nearest neighborhood method and, after that, reduces to the target image in which the pixel value is obtained by averaging a plurality of pixels corresponding to one target pixel of the virtual image.

14 Claims, 17 Drawing Sheets

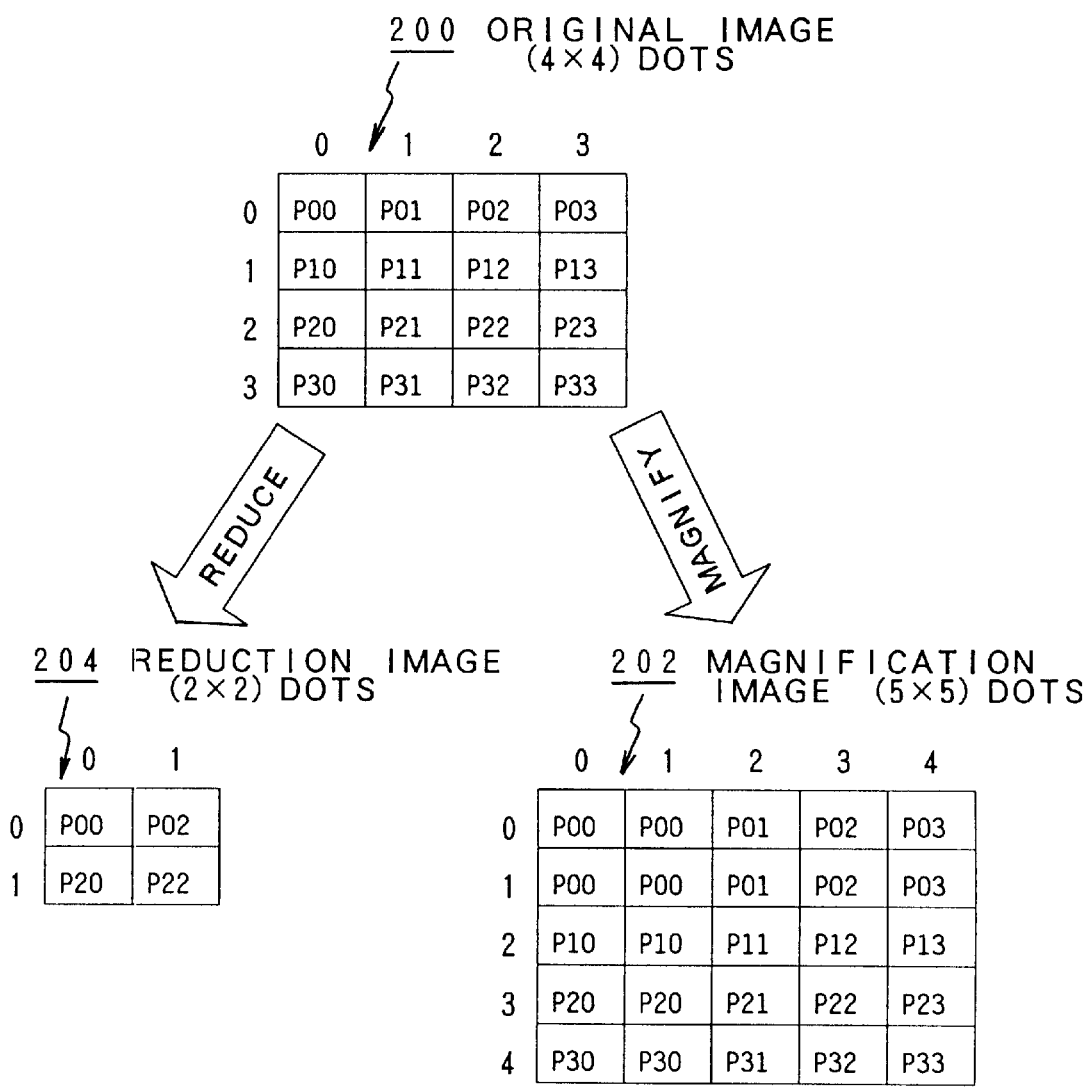

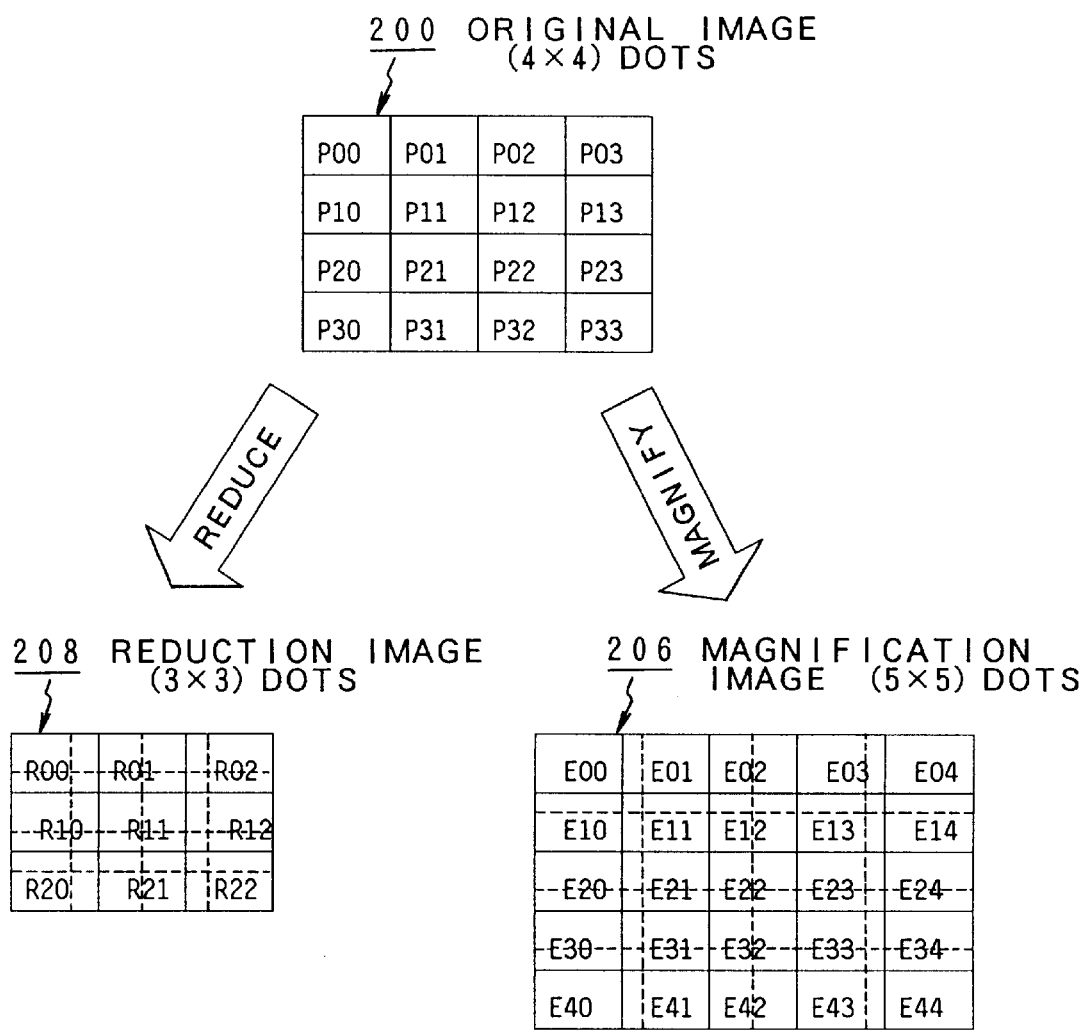

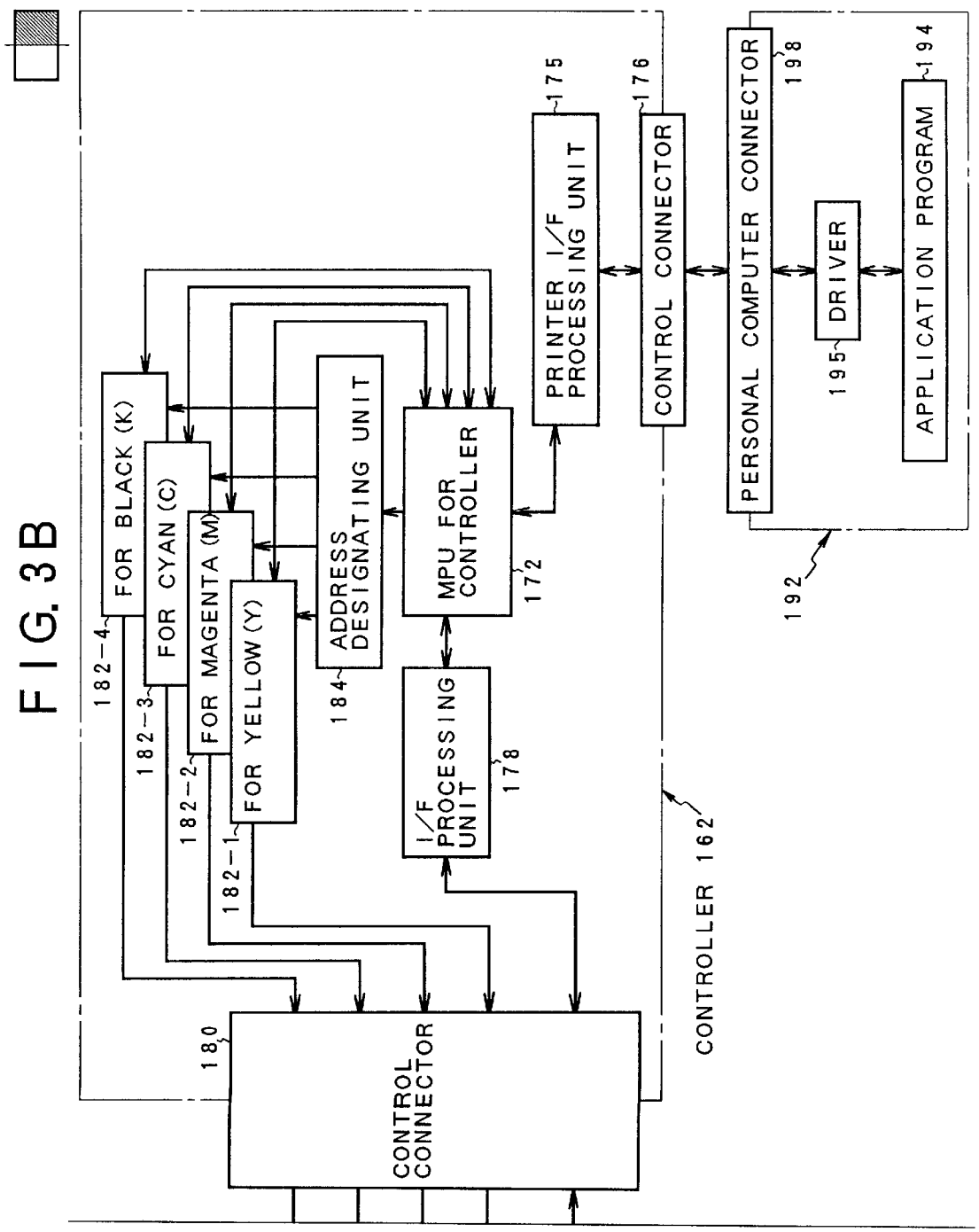

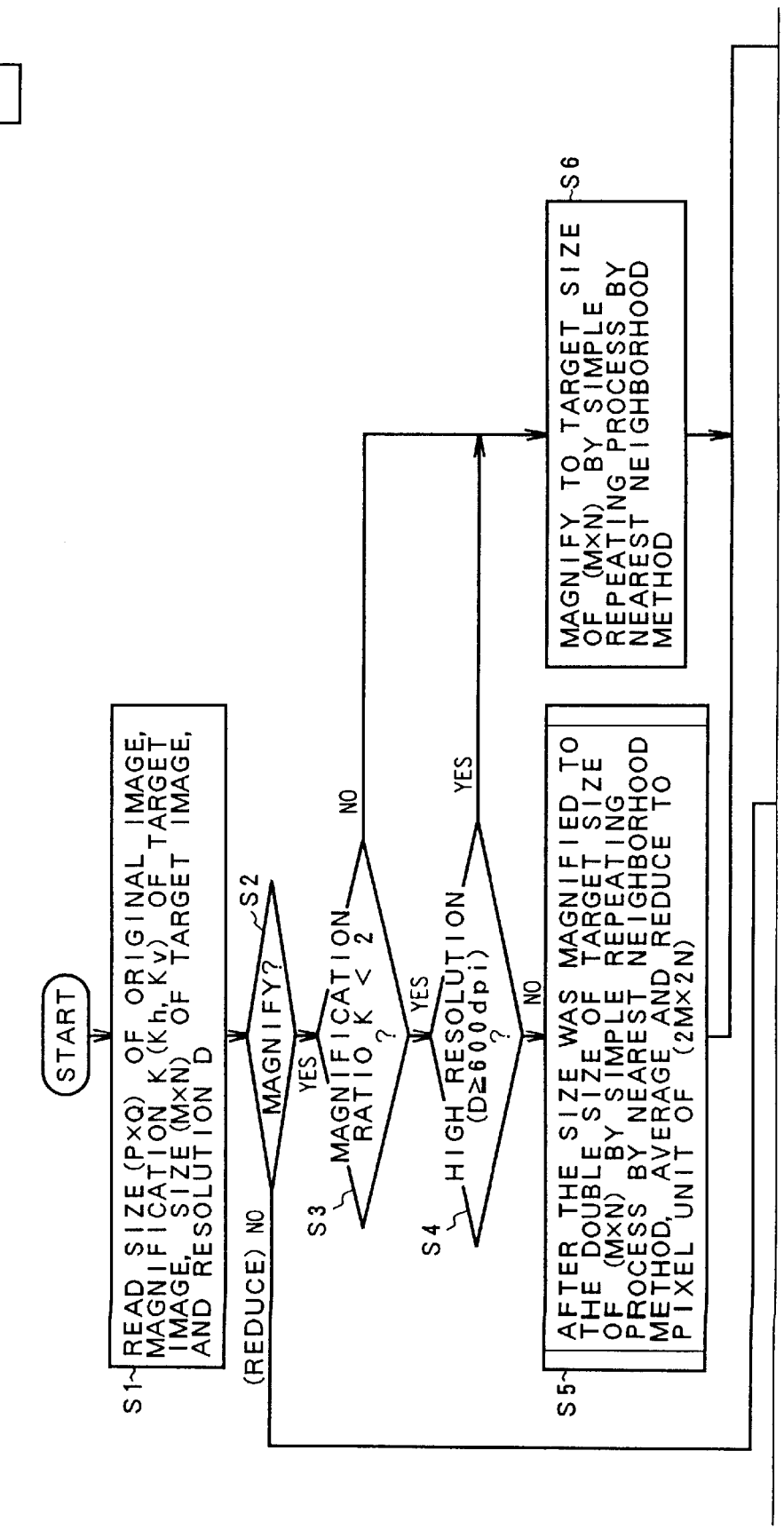

FIG. 8

36 ORIGINAL IMAGE (4×4) DOTS

| p00 | p01 | p02 | p03 |
|-----|-----|-----|-----|
| p10 | p11 | p12 | p13 |
| p20 | p21 | p22 | p23 |
| p30 | p31 | p32 | p33 |

MAGNIFY ⇩  $Kh, Kv = 2.5$

| p00 | p00 | p00 | p01 | p01 | p02 | p02 | p02 | p03 | p03 |
|-----|-----|-----|-----|-----|-----|-----|-----|-----|-----|
| p00 | p00 | p00 | p01 | p01 | p02 | p02 | p02 | p03 | p03 |
| p00 | p00 | p00 | p01 | p01 | p02 | p02 | p02 | p03 | p03 |
| p10 | p10 | p10 | p11 | p11 | p12 | p12 | p12 | p13 | p13 |
| p10 | p10 | p10 | p11 | p11 | p12 | p12 | p12 | p13 | p13 |
| p20 | p20 | p20 | p21 | p21 | p22 | p22 | p22 | p23 | p23 |
| p20 | p20 | p20 | p21 | p21 | p22 | p22 | p22 | p23 | p23 |
| p20 | p20 | p20 | p21 | p21 | p22 | p22 | p22 | p23 | p23 |
| p30 | p30 | p30 | p31 | p31 | p32 | p32 | p32 | p33 | p33 |
| p30 | p30 | p30 | p31 | p31 | p32 | p32 | p32 | p33 | p33 |

40 TARGET IMAGE (10×10) DOTS

FIG. 9
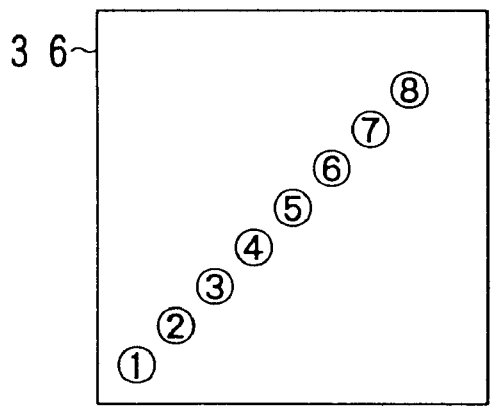
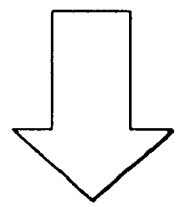
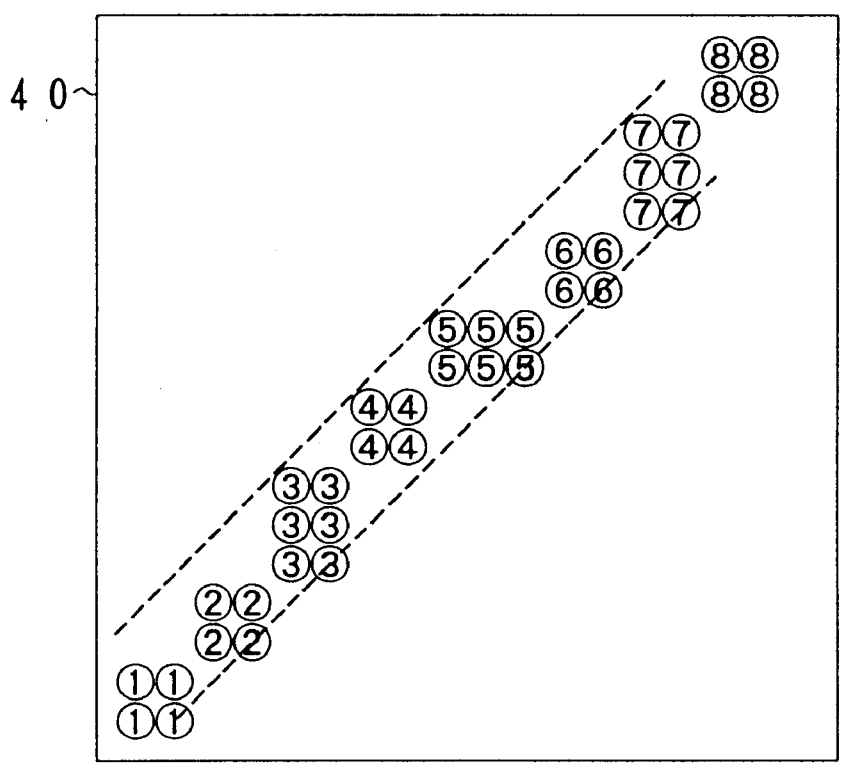

FIG. 12A
FIG. 12B
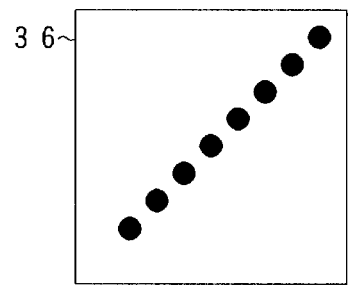
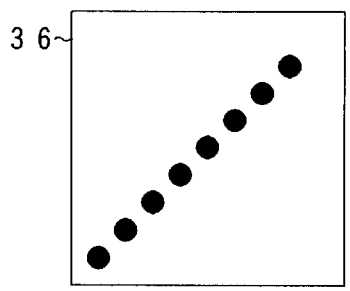
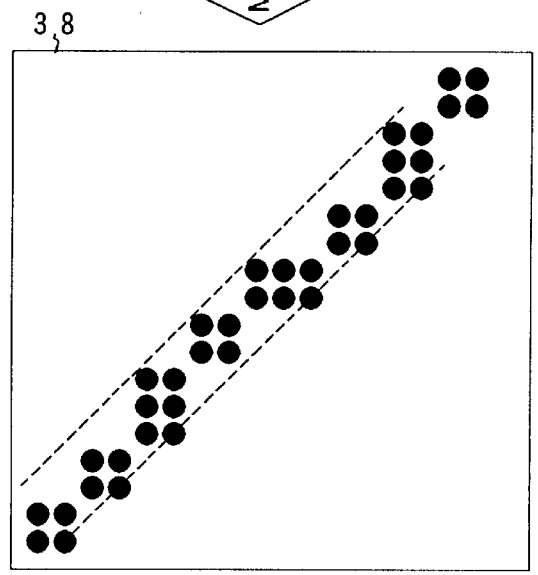
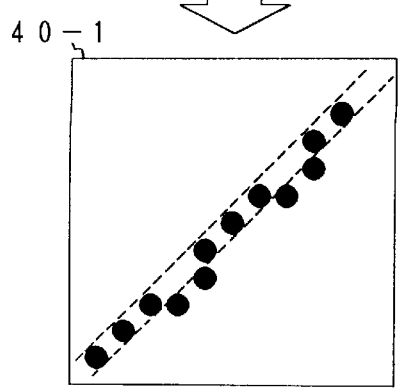
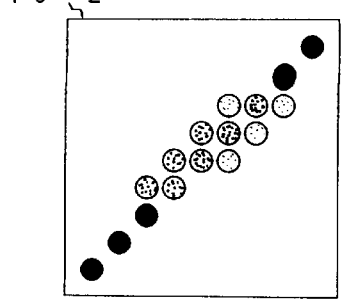

FIG. 13
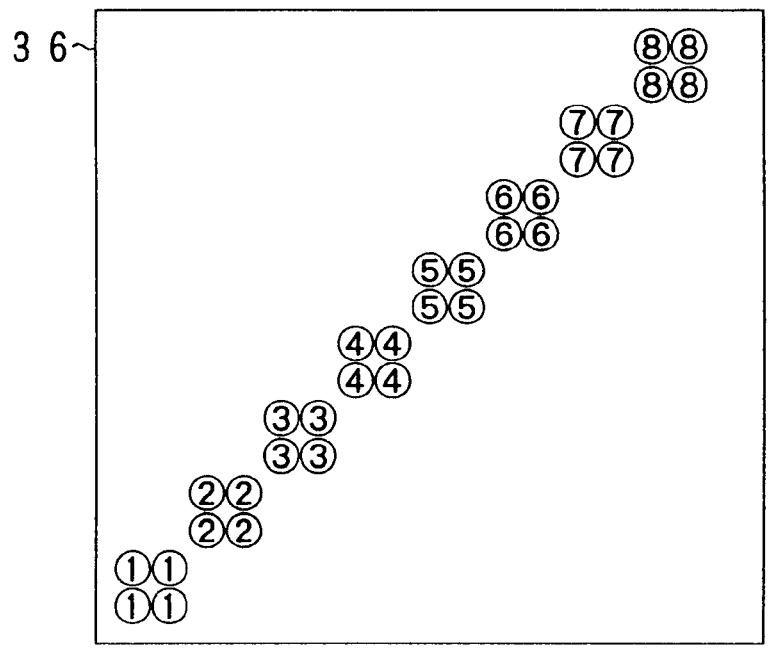
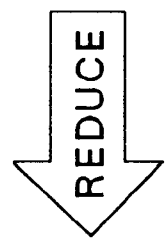
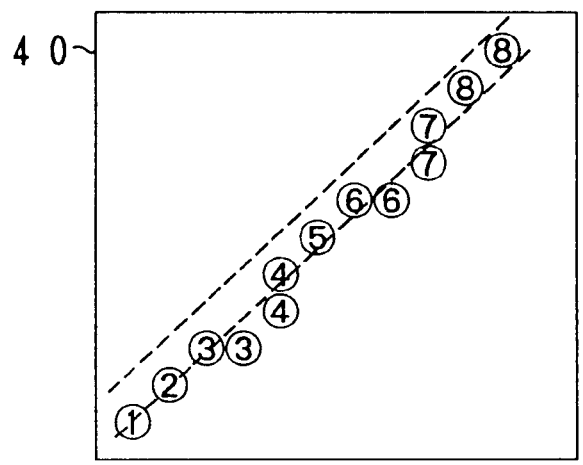

APPARATUS AND METHOD FOR CONVERTING IMAGE SIZE AND RECORDING MEDIUM RECORDING IMAGE SIZE CONVERTING PROGRAM THEREIN AND CAPABLE OF BEING READ BY COMPUTER

BACKGROUND OF THE INVENTION

The present invention relates to image size converting apparatus and method for magnifying or reducing image data by an image processing apparatus or an image processing system such as a printer apparatus or the like and also relates to a recording medium in which an image size converting program has been recorded and which can be read by a computer. More particularly, the invention relates to image size converting apparatus and method for improving a jaggy of an oblique line or drop-out of a thin line occurring by a conversion algorithm of a nearest neighborhood method and also relates to a recording medium in which an image size converting program has been recorded and which can be read by a computer.

Hitherto, there are various methods of an algorithm for magnifying or reducing image data to the designated number of pixels. For example, a nearest neighborhood method and a projecting method are known. According to the nearest neighborhood method, a pixel is repeated in the row direction and the column direction in order to magnify to the designated number of pixels or pixels are thinned out in the row and column directions in order to reduce to the designated number of pixels. Now assuming that the number (n) in the row-column which is subjected to the thinning-out process at the time of reduction and the repeating process at the time of magnification by the nearest neighborhood method is set to n=0, 1, 2, ..., N−1 (where, N is the number of pixels in each of the row-column of a target pixel) and the number in the row-column of an inherent original image is labeled as Pn, the following equation is obtained.

$$Pn=\text{int}\{(\text{the number of original rows or columns})/(\text{the number of rows or columns after magnification or reduction})\times n\} \quad (1)$$

where, "int" denotes that the remainder derived by the division is omitted to thereby obtain an integer.

The magnification and reduction by the nearest neighborhood method will now be described as follows with reference to FIG. 1. In FIG. 1, when an original image 200 of (4×4) dots as the number of pixels in the vertical and horizontal directions is magnified to, for example, a magnification image 102 of (5×5) dots as the number of pixels in the vertical and horizontal directions, the following equation is obtained from the above equation (1).

$$Pn=\text{int}\{(4/5)\times n\}$$

From the above relational equation, Pn=0, 0, 1, 2, 3 are obtained as the number Pn in the row-column of the original image 200 for the number n=0, 1, 2, 3, 4 in the row-column of a magnification image 202. The 0th row and the 0th column of the original image 200 become the row and column which are repeated.

In FIG. 1, when the original image 200 of (4×4) dots is reduced to, for example, a reduction image 104 of (2×2) dots, the following equation is obtained from the equation (1).

$$Pn=\text{int}\{(4/2)\times n\}$$

From the relational equation, Pn=0, 2 is obtained as a number Pn in the row-column of the original image 200 for the number n=0, 1 in the row-column of a reduction image 204. The first row and the first column and the third row and the third column of an original image 100 are the rows and columns which are thinned out.

According to the projecting method, a pixel value of each pixel of the original image and a ratio of the area which is occupied by the original pixels at the time of magnification or reduction are integrated and the sum of the integration results is used as a pixel value of each pixel after the magnification or reduction. A case of converting the original image 200 of (4×4) dots into a magnification image 206 of (5×5) dots by the projecting method will now be described with reference to FIG. 2. It is now assumed that pixels of the original image 200 have values of P00 to P33 and the pixels of the magnification image 206 have values of E00 to E44. When considering the pixel values E00, E11, and E22 of the magnification image as an example, the ratios of the areas which are occupied by the original pixels at the time of magnification will be integrated as follows.

E00=P00

E11=P00×1/25+P01×3/25+P10×3/25+P11×9/25

E22=P11×4/25+P12×4/25+P21×4/25+P22×4/25

A case of converting the original image 200 of (4×4) dots into a reduction image 208 of (3×3) dots by the projecting method will be described. It is now assumed that pixels of the reduction image 208 have values of R00 to R22. When considering the pixel value R00 of the reduction image 208 as an example, a ratio of the area which is occupied by the original pixels at the time of reduction is integrated as follows.

R00=P00×9/16+P01×3/16+P02×3/16+P11×1/16

It can be also approximated as follows in order to simplify the calculation.

R00=P00×1/4+P01×1/4+P02×1/4+P11×1/4

Since the process of the magnification or reduction of the image by the nearest neighborhood method is simple, a processing time is short. If a resolution is low, however, when an oblique line is printed by a printer or the like, there is a problem that a jaggy (stairway portions) is conspicuous and a picture quality deteriorates. Since the thinning-out operation is performed at the time of reduction, there is also a problem that a drop-out occurs in a part of a thin line when it is printed. On the contrary, in the projecting method, although deterioration in picture quality by magnification or reduction is small, since the process is complicated, a processing time required to magnify or reduce an image is long, it takes a long time until the printing operation is started after printing was instructed to a printer, and there is a problem that the printing is troublesome.

SUMMARY OF THE INVENTION

According to the invention, there are provided image size converting apparatus and method which can prevent a jaggy or a drop-out of a thin line and improve a picture quality while using an advantage of a high speed process by a nearest neighborhood method, and there is also provided a recording medium in which an image size converting program has been recorded and which can be read by a computer.

In order to designate parameters necessary for conversion, an image size converting apparatus of the invention comprises: a conversion magnification designating unit for designating a conversion magnification (K) for converting an original image having (P×Q) dots to a target image having different (M×N) dots; a resolution designating unit for designating a resolution (D) of the target image; and an image size designating unit for designating an image size of each of the original image and the target image. As conversion processing units, a first magnification processing unit and a second magnification processing unit are provided for an image magnifying process. The first magnification processing unit magnifies the original image to the target image. When the original image is magnified to the target image, the second magnification processing unit magnifies the original image to a virtual image of I(M×N) dots obtained by multiplying (M×N) dots of the target image by an integer (I) of 2 or larger and, after that, averages the pixels on a unit basis of (I×I) dots which coincides with the multiple (I) with respect to the virtual image, thereby calculating each pixel value of the target image.

The conversion processing unit has a first reduction processing unit, a second reduction processing unit, and a third reduction processing unit for an image reproducing process. The first reduction processing unit reduces the original image to the target image. When the original image is reduced to the target image, the second reduction processing unit magnifies the original image to a virtual image of I(M×N) dots obtained by multiplying (M×N) dots of the target image by the integer (I) of 2 or larger and, after that, averages the pixels on a unit basis of (I×I) dots which coincides with the multiple (I) with respect to the virtual image, thereby calculating each pixel value of the target image. When the original image is reduced to the target image, the third reduction processing unit magnifies the original image to a virtual image of 2×I(M×N) dots obtained by multiplying (M×N) dots as the number of pixels in the vertical and horizontal directions of the target image by the value which is twice as large as the integer (I) of 2 or larger and, after that, averages the pixels on a unit basis of 2(I×I) dots which coincides the multiple (I×2) with respect to the virtual image, thereby calculating each pixel value of the target image.

Further, an optimum processing unit is selected from the first magnification processing unit, the second magnification processing unit, the first reduction processing unit, the second reduction processing unit, and the third reduction processing unit by the process discriminating unit on the basis of the conversion magnification (K), resolution (D), and image size and is allowed to perform a converting process. When the process discriminating unit discriminates the conversion magnification (K) less than 2 and a high resolution of 600 dpi or the low conversion magnification (K) less than 2, the first magnification processing unit magnifies the original image to the target image by interpolation based on the simple repetition of the pixels of the original image. The first magnification processing unit is an algorithm itself of the magnifying process by the nearest neighborhood method. When the conversion magnification is equal to 2 or larger, a jaggy itself is small and is not conspicuous. Even when the conversion magnification (K) is as small as less than 2, since the resolution is high, the jaggy is not conspicuous. When the process discriminating unit discriminates a conversion magnification less than 2 and a low resolution less than 600 dpi, the second magnification processing unit magnifies the original image to a virtual image of 2(M×N) dots obtained by doubling (M×N) dots of the target image and, after that, averages the pixels on a unit basis of (2×2) dots which coincides with the multiple 2 with respect to the virtual image, thereby calculating each pixel value of the target image. As mentioned above, the original image is magnified to the virtual image having the dot size which is twice as large as that of the target image by the interpolation based on the simple repetition by the nearest neighborhood method, and after that, the pixels of the virtual image are averaged on the (2×2) dot unit basis, thereby obtaining the pixel value of each pixel of the target image. Consequently, the jaggy (stairway) portion of the target image is smoothly painted by a gradation change of the pixels. Even though the resolution is low, the jaggy is not conspicuous. When the process discriminating unit discriminates a conversion magnification (K) less than 1 and a high resolution of 600 dpi or more or discriminates a conversion magnification (K) less than 1, a resolution (D) less than 600 dpi, and an image size (S) larger than (2000×2000) dots of the original image and the target image, the original image is reduced to the target image by simply thinning out the pixels of the original image by the first reduction processing unit. At the time of the reduction when the resolution is high or at the time of the reduction when the resolution is not so high but the image size is large, even if the nearest neighborhood method is used as it is, the jaggy is not conspicuous and the drop-out of the thin line does not occur as well. When the process discriminating unit discriminates that the conversion magnification is less than 1 and the resolution is about an intermediate resolution which is lower than 600 dpi and is 300 dpi or more and the image size is small to be smaller than (2000×2000) dots, the second reduction processing unit magnifies the original image to a virtual image of 2(M×N) dots which is twice as large as (M×N) dots of the target image and, after that, averages the pixels on a unit basis of (2×2) dots which coincides with the multiple 2 with respect to the virtual image, thereby calculating each pixel value of the target image. For example, when an original image of (4×4) dots is magnified to a target image of (5×5) dots, the second reduction processing unit magnifies the original image to a virtual image of (10×10) dots obtained by doubling (5×5) dots of the target image and, after that, averages the pixels on a unit basis of (2×2) dots which coincides with the multiple 2 with respect to the virtual image, thereby calculating each pixel value of the target image. As mentioned above, the original image is magnified to the virtual image having the dot size which is twice as large as that of the reduced target image by the interpolation based on the simple repetition by the nearest neighborhood method and, after that, the pixels of the virtual image are averaged on a unit basis of (2×2) dots, thereby obtaining the pixel value of each pixel of the target image. Consequently, the jaggy (stairway) portion of the target image is smoothly painted by the gradation change of the pixels. Even when the resolution is low, the jaggy is not conspicuous and no drop-out of the thin line occurs. When the process discriminating unit discriminates a conversion magnification less than 1, a low resolution less than 300 dpi, and a small image size less than (2000×2000) dots, the third reduction processing unit magnifies the original image to a virtual image of 4(M×N) dots which is four times as large as (M×N) dots of the target image and, after that, averages the pixels on the unit basis of (4×4) dots which coincides with the multiple 4 with respect to the virtual image, thereby calculating each pixel value of the target image. When the resolution is further lowered to less than 300 dpi, the size of the virtual image is further magnified to four times as large as the target image and the original image is magnified and, after that, the pixels of the virtual image are averaged on a unit basis of (4×4) dots, thereby obtaining the pixel value of each pixel of the target image. Consequently, the gradation change in the jaggy portion is further uniformed. Even when the resolution is low, the jaggy is not conspicuous and no drop-out of the thin line occurs.

According to the invention, there is provided an image size converting method comprising:

a conversion magnification designating step of designating a conversion magnification (K) for converting an original image having (P×Q) dots as a predetermined number of pixels in the vertical and horizontal directions to a target image of (M×N) dots as a different number of pixels in the vertical and horizontal directions;

a resolution designating step of designating a resolution of the target image;

a first magnification processing step of magnifying the original image to the target image;

a second magnification processing step of magnifying the original image to a virtual image of I(M×N) dots as the number of pixels in the vertical and horizontal directions obtained by multiplying (M×N) dots as the number of pixels in the vertical and horizontal directions of the target image by an integer (I) of 2 or larger and, after that, averaging the pixels on a unit basis of (I×I) dots as the number of pixels in the vertical and horizontal directions which coincides with the multiple (I) with respect to the virtual image, thereby calculating each pixel value of the target image when the original image is magnified to the target image;

a first reduction processing step of reducing the original image to the target image;

a second reduction processing step of magnifying the original image to a virtual image of I(M×N) dots as the number of pixels in the vertical and horizontal directions obtained by multiplying (M×N) dots as the number of pixels in the vertical and horizontal directions of the target image by the integer (I) of 2 or larger, and after that, averaging the pixels on the unit basis of (I×I) dots as the number of pixels in the vertical and horizontal directions which coincides with the multiple (I) with respect to the virtual image, thereby calculating each pixel value of the target image when the original image is reduced to the target image;

a third reduction processing step of magnifying the original image to a virtual image of 2I(M×N) dots as the number of pixels in the vertical and horizontal directions which is obtained by multiplying (M×N) dots as the number of pixels in the vertical and horizontal directions of the target image by the value which is twice as large as the integer (I) of 2 or larger, and after that, averaging the pixels on the unit basis of 2(I×I) dots as the number of pixels in the vertical and horizontal directions which coincides with the multiple (I×2) with respect to the virtual image, thereby calculating each pixel value of the target image when the original image is reduced to the target image; and a process discriminating step of selecting an optimum processing step among the first magnification processing step, the second magnification processing step, the first reduction processing step, the second reduction processing step, and the third reduction processing step on the basis of a conversion magnification, a resolution, and an image size and allowing the selected processing step to execute a converting process.

According to the invention, there is provided a recording medium in which an image size conversion program has been recorded and which can be read by a computer, comprising:

a conversion magnification designating module for designating a conversion magnification (K) for converting an original image having (P×Q) dots as a predetermined number of pixels in the vertical and horizontal directions to a target image of (M×N) dots as a different number of pixels in the vertical and horizontal directions;

a resolution designating module for designating a resolution of the target image;

a first magnification processing module for magnifying the original image to the target image;

a second magnification processing module for magnifying the original image to a virtual image of I(M×N) dots as the number of pixels in the vertical and horizontal directions obtained by multiplying (M×N) dots as the number of pixels in the vertical and horizontal directions of the target image by an integer (I) of 2 or larger and, after that, averaging the pixels on a unit basis of (I×I) dots as the number of pixels in the vertical and horizontal directions which coincides with the multiple (I) with respect to the virtual image, thereby calculating each pixel value of the target image when the original image is magnified to the target image;

a first reduction processing module for reducing the original image to the target image;

a second reduction processing module for magnifying the original image to a virtual image of I(M×N) dots as the number of pixels in the vertical and horizontal directions obtained by multiplying (M×N) dots as the number of pixels in the vertical and horizontal directions of the target image by the integer (I) of 2 or larger, and after that, averaging the pixels on the unit basis of (I×I) dots as the number of pixels in the vertical and horizontal directions which coincides with the multiple (I) with respect to the virtual image, thereby calculating each pixel value of the target image when the original image is reduced to the target image;

a third reduction processing module for magnifying the original image to a virtual image of 2I(M×N) dots as the number of pixels in the vertical and horizontal directions which is obtained by multiplying (M×N) dots as the number of pixels in the vertical and horizontal directions of the target image by the value which is twice as large as the integer (I) of 2 or larger, and after that, averaging the pixels on the unit basis of 2(I×I) dots as the number of pixels in the vertical and horizontal directions which coincides with the multiple (I×2) with respect to the virtual image, thereby calculating each pixel value of the target image when the original image is reduced to the target image; and a process discriminating module for selecting an optimum processing module among the first magnification processing module, the second magnification processing module, the first reduction processing module, the second reduction processing module, and the third reduction processing module on the basis of a conversion magnification, a resolution, and an image size and allowing the selected processing module to execute a converting process.

Further, according to the invention, a novel conversion algorithm which reduces and converts the original image to the target image by forming an intermediate virtual image and obtains an average of a plurality of pixels of the virtual image when the original image is magnified or reduced. For this purpose, according to the invention, there are provided: a conversion magnification designating unit for designating a conversion magnification (K) for converting an original image having (P×Q) dots as a predetermined number of pixels in the vertical and horizontal directions to a target image of (M×N) dots as a different number of pixels in the vertical and horizontal directions; and a conversion processing unit for magnifying the original image to a virtual image of I(M×N) dots as the number of pixels in the vertical and horizontal directions obtained by multiplying (M×N) dots as the number of pixels in the vertical and horizontal directions by an integer (I) of 2 or larger and, after that, averaging the pixels on a unit basis of (I×I) dots as the number of pixels in the vertical and horizontal directions which coincides with the multiple (I) with respect to the virtual image, thereby calculating each pixel value of the target image. The conversion processing unit is characterized in that it corresponds to the above-mentioned second magnification processing unit, second reduction processing unit, and third reduction processing unit, and executes a process for magnifying the original image to a virtual image having a dot size obtained by magnifying the target image by an interpolation based on a simple repetition by the nearest neighborhood method and, after that, averaging a plurality of pixels of the virtual image corresponding to one pixel of the target image, thereby obtaining the pixel value. Consequently, the jaggy (stairway) portion of the target image is smoothly painted by gradation change of the pixels. Even when the resolution is low at the time of magnification or reduction, the jaggy is not conspicuous. No drop-out of a thin line occurs at the time of reduction. When the process discriminating unit discriminates a conversion magnification less than 2 and a low resolution less than 600 dpi, the process converting unit magnifies the original image to a virtual image of 2(M×N) dots as the number of pixels in the vertical and horizontal directions which is twice as large as (M×N) dots as the number of pixels in the vertical and horizontal directions of the target image and, after that, averages the pixels on a unit basis of (2×2) dots as the number of pixels in the vertical and horizontal directions which coincides with the multiple 2 with respect to the virtual image, thereby calculating each pixel value of the target image. The process of the conversion processing unit corresponds to the process of the second magnification processing unit as mentioned above. When the process discriminating unit discriminates a conversion magnification less than 1, an intermediate resolution which is less than 600 dpi and is equal to 300 dpi or more, and a small image size less than (2000×2000) dots, the conversion processing unit magnifies the original image to a virtual image of 2(M×N) dots as the number of pixels in vertical and horizontal directions which is twice as large as (M×N) dots as the number of pixels in the vertical and horizontal directions of the target image and, after that, averages the pixels on a unit basis of (2×2) dots as the number of pixels in the vertical and horizontal directions which coincides with the multiple 2 with respect to the virtual image, thereby calculating each pixel value of the target image. The process of the conversion processing unit corresponds to the process of the second reduction processing unit as mentioned above. Further, when the process discriminating unit discriminates a conversion multiplication less than 1, a low resolution less than 300 dpi, and a small image size less than (2000×2000) dots, the conversion processing unit magnifies the original image to a virtual image of 4(M×N) dots as the number of pixels in the vertical and horizontal directions which is four times as large as (M×N) dots of the target image as the number of pixels in the vertical and horizontal directions of the target image and, after that, averages the pixels on a unit basis of (4×4) dots as the number of pixels in the vertical and horizontal directions which coincides with the multiple 4 with respect to the virtual image, thereby calculating each pixel value of the target image. The process of the conversion processing unit corresponds to the process of the third reduction processing unit. The magnification conversion from the original image to the virtual image in the conversion processing unit is performed by the algorithm of the nearest neighborhood method, that is, an interpolating process based on a simple repetition of the pixel of the original image.

According to the invention, there is provided an image size converting method comprising:

a conversion magnification designating step of designating a conversion magnification (K) for converting an original image having (P×Q) dots as a predetermined number of pixels in the vertical and horizontal directions to a target image having (M×N) dots as a different number of pixels in the vertical and horizontal directions; and a conversion processing step of magnifying the original image to a virtual image of I(M×N) dots as the number of pixels in the vertical and horizontal directions which is obtained by multiplying (M×N) dots as the number of pixels in the vertical and horizontal directions of the target image by an integer (I) of 2 or larger and, after that, averaging the pixels on a unit basis of (I×I) dots as the number of pixels in the vertical and horizontal directions which coincides with the multiple (I) with respect to the virtual image, thereby calculating each pixel value of the target image.

Further, according to the invention, there is provided a recording medium in which an image size conversion program has been recorded and which can be read by a computer, having the following functions:

a conversion magnification designating module for designating a conversion multiplication (K) for converting an original image having (P×Q) dots as a predetermined number of pixels in the vertical and horizontal directions to a target image having (M×N) dots as a different number of pixels in the vertical and horizontal directions; and a conversion processing module for magnifying the original image to a virtual image of I(M×N) dots as the number of pixels in the vertical and horizontal directions which is obtained by multiplying (M×N) dots of the target image as the number of pixels in the vertical and horizontal directions of the target image by the integer (I) of 2 or larger and, after that, averaging the pixels on a unit basis of (I×I) dots as the number of pixels in the vertical and horizontal directions which coincides with the multiple (I) with respect to the virtual image, thereby calculating each pixel value of the target image.

The above and other objects, features, and advantages of the present invention will become more apparent from the following detailed description with reference to the drawings.

BRIEF DESCRIPTION OF DRAWINGS

FIG. 1 is an explanatory diagram of an image conversion by a nearest neighborhood method;

FIG. 2 is an explanatory diagram of an image conversion by a projecting method;

FIGS. 3A and 3B are block diagrams of a personal computer and a color printing apparatus to which the invention is applied;

FIGS. 7A and 7B are flowcharts for the image size converting process of the invention;

FIG. 8 is an explanatory diagram of a magnifying process by a first magnification processing unit in FIG. 6;

FIG. 9 is an explanatory diagram of a conversion image by the first magnification processing unit in FIG. 6;

FIGS. 12A and 12B are explanatory diagrams in which a target image obtained by the magnifying process of the invention by using the virtual image in FIG. 11 is compared with that obtained by an interpolation magnifying process by a simple repetition of the nearest neighborhood method;

FIG. 13 is an explanatory diagram of a conversion image by a first reduction processing unit in FIG. 6;

DETAILED DESCRIPTION OF THE PREFERRED EMBODIMENT

[Color printing apparatus]

Figure 3A:
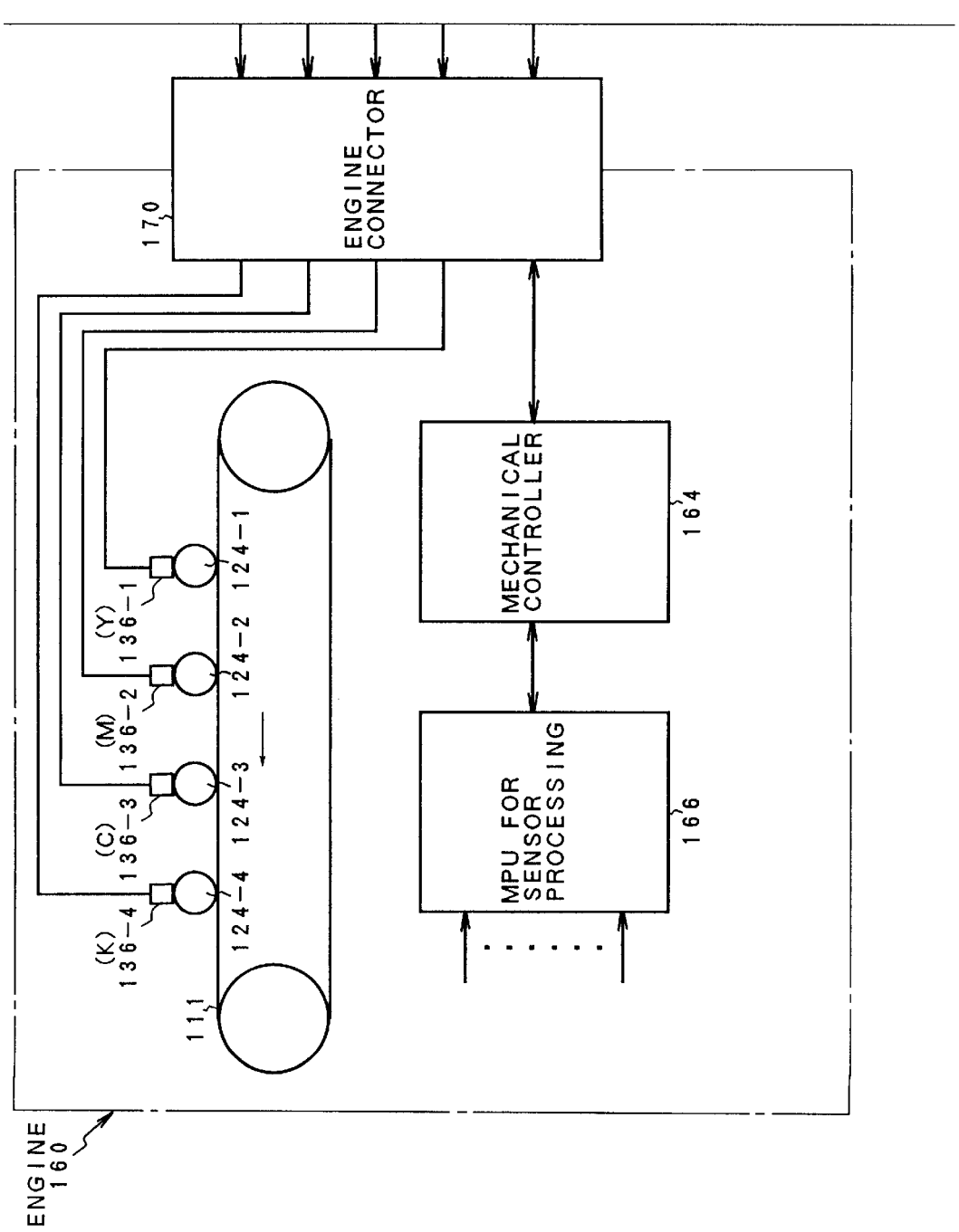

FIGS. 3A and 3B are block diagrams of a personal computer and a color printing apparatus to which an image size converting apparatus of the invention is applied. The color printing apparatus comprises an engine 160 and a controller 162. A mechanical controller 164 for controlling the operation of a printing mechanical unit of a conveying belt unit 111, electrostatic recording units 124-1 to 124-4, and the like is provided in the engine 160. An MPU 166 for sensor processing to execute processes of various sensors (not shown) arranged in the engine 160 is provided for the mechanical controller 164. The mechanical controller 164 is connected to the controller 162 side via an engine connector 170. In this instance, as a printing mechanism provided for the engine 160, an endless belt 112 and LED arrays 136-1, 136-2, 136-3, and 136-4 provided for the electrostatic recording units of Y, M, C, and K are shown.

Figure 4:
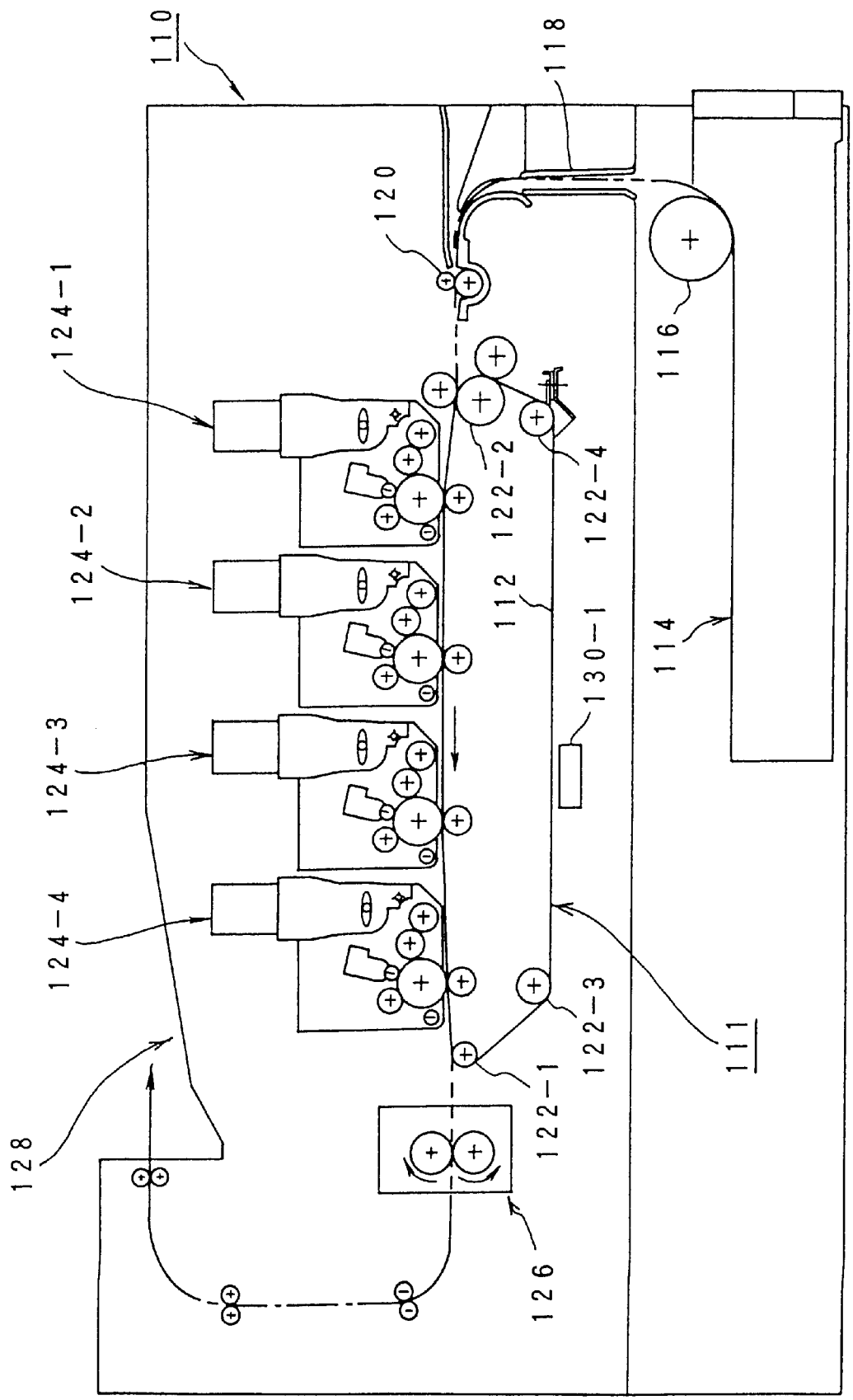
FIG. 4 is an internal structure diagram of the color printing apparatus to which the invention is applied.

FIG. 4 shows an internal structure of the color printing apparatus in FIGS. 3A and 3B. The conveying belt unit 111 to convey a recording medium, for example, a recording paper is provided in an apparatus main body 110. The endless belt 112 made of a flexible dielectric material, for example, a proper synthetic resin material is rotatably attached to the conveying belt unit 111. The endless belt 112 is wound around four rollers 122-1, 122-2, 122-3, and 122-4. The conveying belt unit 111 is detachably attached to the apparatus main body 110. The roller 122-1 functions as a driving roller. The driving roller 122-1 derives the endless belt 112 so as to run counterclockwise at a predetermined speed as shown by an arrow by a driving mechanism (not shown). The driving roller 122-1 also functions as an AC removing roller for removing charges from the endless belt 112. The roller 122-2 functions as a driven roller and also functions as a charging roller for applying charges to the endless belt 112. Both of the rollers 122-3 and 122-4 function as guide rollers and are arranged near the driving roller 122-1 and driven roller 122-2. An upper running portion of the endless belt 112 between the driven roller 122-2 and driving roller 122-1 forms a moving path of the recording paper. The recording papers have been stacked in a hopper 114 and are picked up and fed one by one from the top recording paper in the hopper 114 by a pickup roller 116. The recording paper passes through a recording paper guide path 118 and is guided from the driven roller 122-2 side of the endless belt 112 to a recording paper moving path on the belt side by a pair of recording paper feed rollers 120. The recording paper which passed the recording paper moving path is ejected from the driving roller 122-1. Since the endless belt 112 is charged by the driven roller 122-2, when the recording paper is guided from the driven roller 122-2 side to the recording paper moving path, it is electrostatically adsorbed to the endless belt 112, so that a positional deviation of the recording paper during the movement is prevented. On the other hand, since the driving roller 122-1 on the ejecting side functions as a discharging roller, the charges of the endless belt 112 in a portion which is in contact with the driving roller 122-1 are removed. Therefore, when the recording paper passes the driving roller 122-1, the charges on the recording paper are removed. The recording paper is easily peeled off from the endless belt 112 and is ejected without being wound to a lower portion of the belt. The four electrostatic recording units 124-1, 124-2, 124-3, and 124-4 of Y, M, C, and K are provided in the apparatus main body 110 and have a tandem structure such that the recording units are sequentially serially arranged in accordance with the order of Y, M, C, and K from the upstream side to the downstream side along the recording paper moving path on the upper side of the endless belt 112 defined between the driven roller 122-2 and driving roller 122-1 of the endless belt 112. The electrostatic recording units 124-1 to 124-4 have substantially the same structure except for a different point that a yellow toner component (Y), a magenta toner component (M), a cyan toner component (C), and a black toner component (K) are used as developing agents, respectively. Consequently, the electrostatic recording units 124-1 to 124-4 sequentially overlap, transfer, and record a yellow toner image, a magenta toner image, a cyan toner image, and a black toner image onto the recording paper which is moved along the recording paper moving path on the upper side of the endless belt 112, thereby forming a full color toner image.

Figure 5:
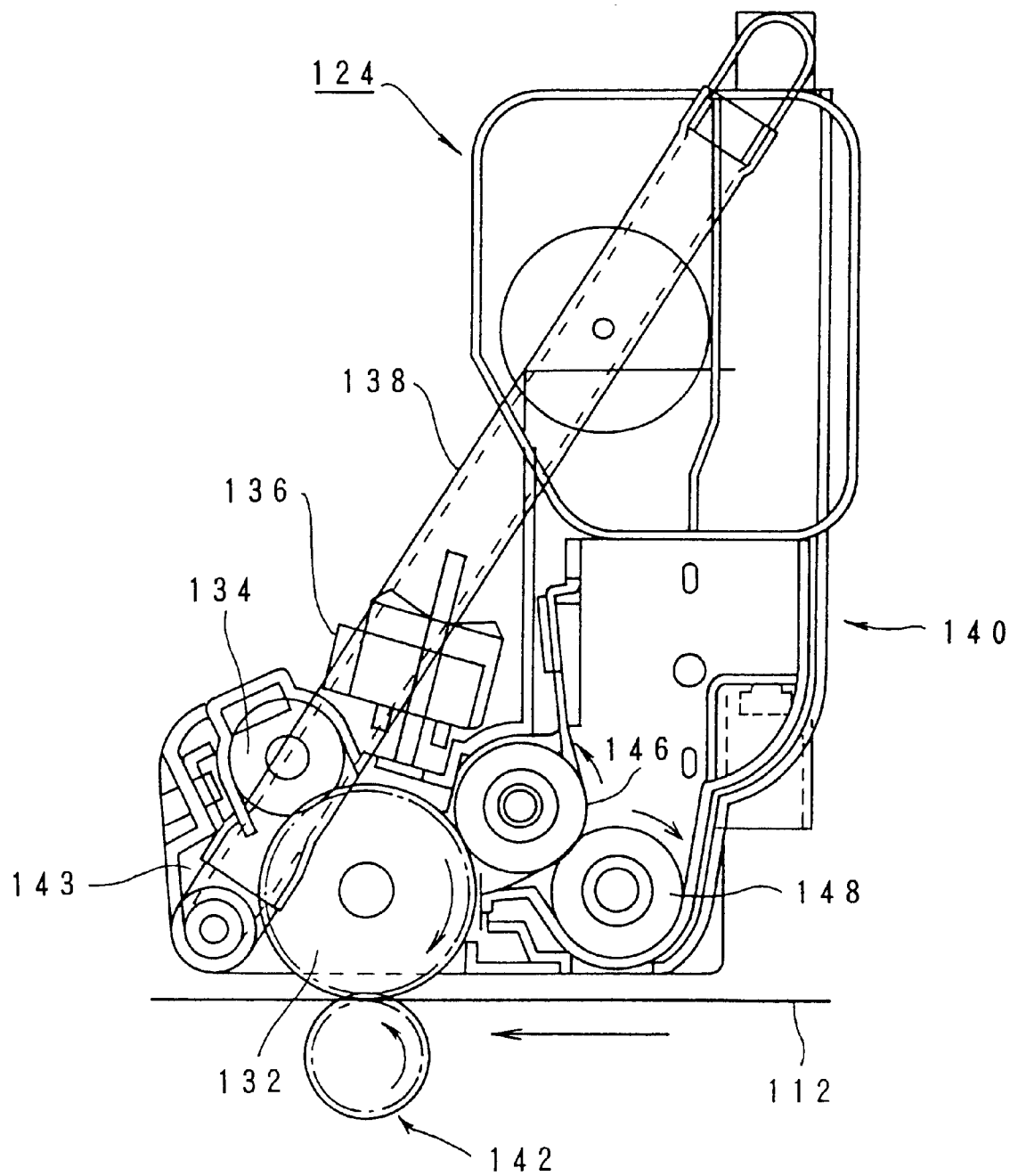
FIG. 5 is a cross sectional view of an electrostatic recording unit in FIGS. 3A and 3B.

FIG. 5 shows one of the electrostatic recording units 124-1 to 124-4 in FIG. 4. The electrostatic recording unit 124 has a photosensitive drum 132. In the recording operation, the photosensitive drum 132 is rotated clockwise. A precharging device 134 constructed as, for example, a corona charging device, a scorotron charging device, or the like is arranged over the photosensitive drum 132. The rotating surface of the photosensitive drum 132 is uniformly charged by the precharging device 134. An LED array 136 functioning as an optical writing unit is arranged in a charged area of the photosensitive drum 132. An electrostatic latent image is written by light emitted by the scanning of the LED array 136. That is, light emitting devices arranged in the main scanning direction of the LED array 136 are driven on the basis of a gradation value of color pixel data (dot data) developed from image data that is inputted as print information from a computer, a word processor, or the like. Therefore, the electrostatic latent image is written as a dot image. The electrostatic latent image written on the photosensitive drum 132 is electrostatically developed as a charged toner image by predetermined color toner by a developer 140 arranged above the photosensitive drum 132. The charged toner image on the photosensitive drum 132 is electrostatically transferred onto the recording paper by a conductive transfer roller 142 locating under the drum 132. That is, the conductive transfer roller 142 is arranged through a micro gap between the roller 142 and photosensitive drum 132 via the endless belt 112 and applies charges of a polarity opposite to that of the charged toner image to the recording paper conveyed by the endless belt 112. Consequently, the charged toner image on the photosensitive drum 132 is electrostatically transferred onto the recording paper. After completion of the transferring process, residual toner remaining without being transferred to the recording paper is deposited on the surface of the photosensitive drum 132. The residual toner is removed by a toner cleaner 143 provided on the downstream side of the recording paper moving path for the photosensitive drum 132. The removed residual toner is returned to the developer 140 by a screw conveyer 138 and is reused as developing toner.

Referring again to FIG. 4, when the recording paper passes the recording paper moving path between the driven roller 122-2 and driving roller 122-1 of the endless belt 112, the toner images of four colors of Y, M, C, and K are overlapped and transferred onto the recording paper by the electrostatic recording units 124-1 to 124-4, thereby forming a full color image onto the recording paper. The recording paper is conveyed from the driving roller 122-1 side to a thermally fixing device 126 of the heat roller type and a heat fixing operation is performed to the recording paper with the full color image. The recording paper to which the heat fixing operation was performed passes the guide rollers and is positioned and stacked in a stacker 128 provided in the upper portion of the apparatus main body. When the user wants to supply the toner to the electrostatic recording units 124-1 to 124-4 and perform a maintenance, the recording unit can be easily detached by pulling upward in a manner like a case of, for example, the electrostatic recording unit 124-3.

Referring again to FIGS. 3A and 3B, an MPU 172 for controller is provided for the controller 162. A printer I/F processing unit 175 serving as a transfer destination of the color image transferring process is provided for the MPU 172 for controller and is connected to, for example, a personal computer 192 as an upper apparatus through a control connector 176. The personal computer 192 has a driver 195 for transferring color image data which is inputted from an arbitrary application program 194 to the color printing apparatus. The driver 195 has a function serving as an image size converting apparatus of the invention and executes a converting process for optimum magnification or reduction from an original image to a target image based on a designated magnification (K), a designated resolution (D), and a designated image size (S). The driver 195 is connected to the printer I/F processing unit 175 provided in the controller 162 on the printing apparatus side through a personal computer connector 198.

In this instance, color image data on the application program 194 of the personal computer 192 is, for example, RGB data. On the other hand, color image data on the color printing apparatus side is YMCK data. Therefore, a color converting function for converting the RGB data transferred from the driver into the YMCK data for printing is provided for the printer I/F processing unit 175 of the printing apparatus side. Image memories 182-1, 182-2, 182-3, and 182-4 for developing the image data of Y, M, C, and K obtained by the color conversion of the RGB image data transferred from the personal computer 192 into pixel data (dot data) and storing are provided for the MPU 172 for controller of the controller 162. The MPU 172 for controller has an address designating unit 184 for executing an address designation when the color pixel data of YMCK is developed in the image memories 182-1 to 182-4.

[Image size converting process]

Figure 6:
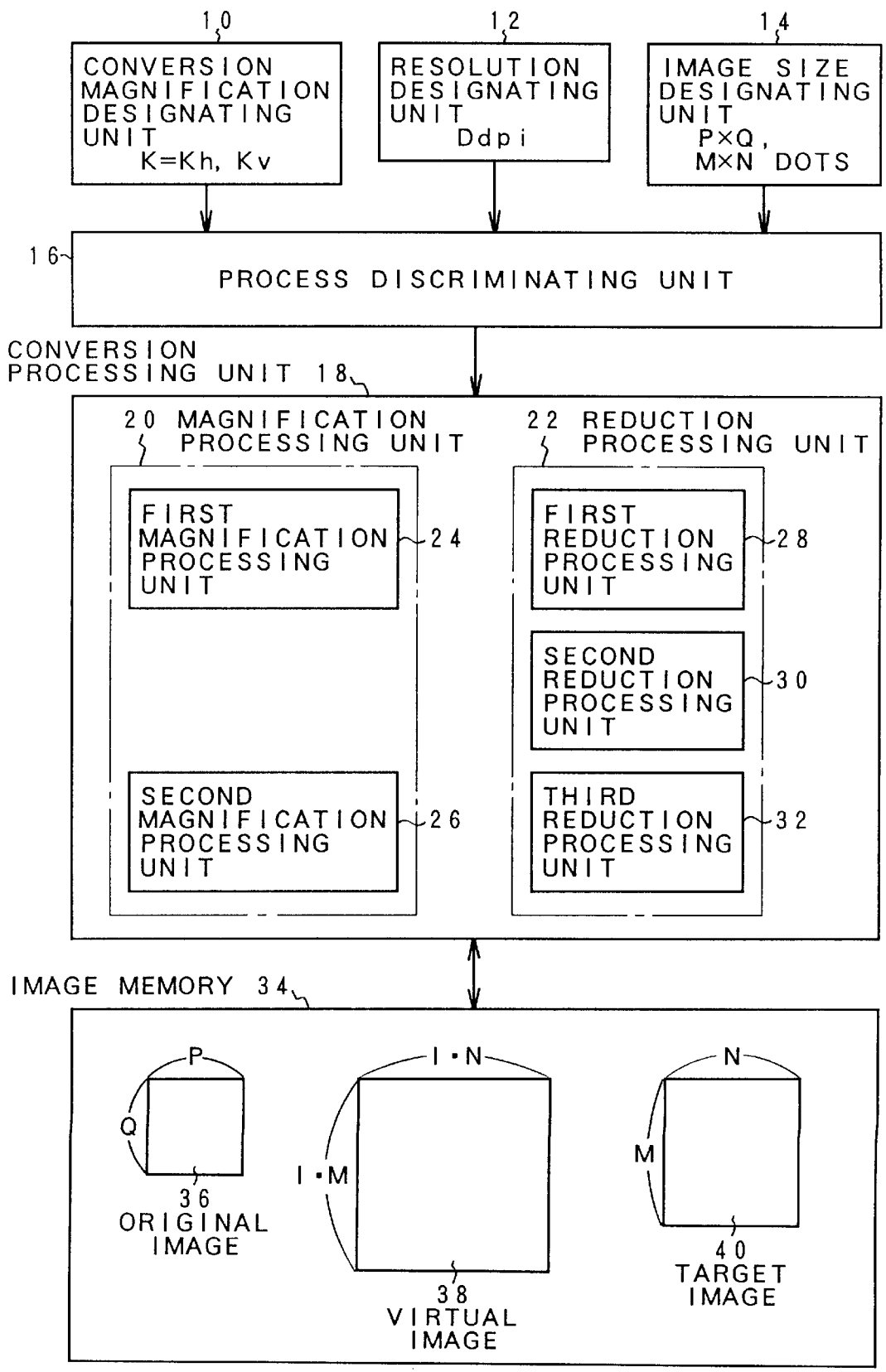
FIG. 6 is a functional block diagram of an image size converting process of the invention.

FIG. 6 is a functional block diagram of the image size converting apparatus according to the invention. In order to set various parameters which are used for the converting process, the image size converting apparatus of the invention comprises: a conversion magnification designating unit 10; a resolution designating unit 12; and an image size designating unit 14. The conversion magnification designating unit 10 designates the conversion magnification (K), specifically speaking, designates a conversion magnification Kh in the lateral direction (horizontal direction) and a conversion magnification Kv in the vertical direction of the target image. The resolution designating unit 12 designates a resolution Ddpi of, for example, the color printing apparatus in FIGS. 3A and 3B for executing the image output. Further, the image size designating unit 14 designates the image sizes (S) of the original image and target image. In this instance, the size of the original image is shown by (P×Q) dots as the number of pixels in the vertical and horizontal directions and the size of the target image is shown by (M×N) dots as the number of pixels in the vertical and horizontal directions. A process discriminating unit 16 inputs the parameters (K, D, S) designated by the conversion magnification designating unit 10, resolution designating unit 12, and image size designating unit 14, selects the converting process for optimum magnification or reduction in a conversion processing unit 18 in accordance with predetermined discriminating conditions, thereby allowing the conversion processing unit 18 to execute the conversion. A magnification processing unit 20 and a reduction processing unit 22 are provided in the conversion processing unit 18. The magnification processing unit 20 has a first magnification processing unit 24 and a second magnification processing unit 26. The reduction processing unit 22 has a first reduction processing unit 28, a second reduction processing unit 30, and a third reduction processing unit 32. For an original image 36 stored in an image memory 34 as a target, the conversion processing unit 18 executes the converting process to obtain a target image 40 by selecting the optimum processing unit among the first magnification processing unit 24, second magnification processing unit 26, first reduction processing unit 28, second reduction processing unit 30, and third reduction processing unit 32 on the basis of the conversion parameters (K, D, S) discriminated by the process discriminating unit 16 at that time. In this instance, the first magnification processing unit 24 and first reduction processing unit 28 provided in the conversion processing unit 18 magnifies or reduces the original image to the target image 40 in accordance with a conversion algorithm of the nearest neighborhood method in FIG. 1, respectively. That is, in the first magnification processing unit 24, the original image 36 is magnified to the target image 40 by the interpolation based on the simple repetition of the pixel of the original image 36. In the first reduction processing unit 28, the original image 36 is reduced to the target image 40 by simply thinning out the pixels of the original image 36. Specifically speaking, the number (n) of the matrix (vertical·horizontal) of the target image 40 is substituted into the expression (1) by setting (n=0, 1, 2, . . . ), the number Pn of the matrix (vertical·horizontal) of the corresponding original image 36 is calculated. Upon magnification, the matrix number of the original image 36 which is subjected to the interpolation by the simple repetition is obtained and the original image is magnified by the interpolating process. Upon reduction, the matrix number which is subjected to the thinning-out process is obtained from the original image 36 and the original image is reduced by the thinning-out process. On the other hand, in the second magnification processing unit 26, second reduction processing unit 30, and third reduction processing unit 32, as shown in the image memory 34, after the original image 36 was magnified to a virtual image 38 by the nearest neighborhood method, the virtual image 38 is converted into the target image 40 by the reduction by averaging a plurality of pixels of the virtual image 38. In case of converting the image via the intermediate virtual image 38 as mentioned above, the virtual image 38 has a size obtained by magnifying the target image 40 by the integer (I) of 2 or more. That is, when it is assumed that the size of target image 40 is equal to (M×N) dots, the virtual image 38 has a size of I(M×N) dots obtained by multiplying it by (I). In the second magnification processing unit 26 and second reduction processing unit 30 of the conversion processing unit 18, the magnification (I) for the target image 40 of the virtual image 38 is set to (I=2). Therefore, the size of virtual image 38 which is used in the second magnification processing unit 26 and second reduction processing unit 30 is equal to (2M×2N) dots that is twice as large as (M×N) dots of the target image 40. In the third reduction processing unit 32, the magnification (I) of the virtual image 38 for the target image 40 is set to (I=4). Therefore, the size of virtual image 38 is set to (4M×4N) dots. The details of the converting process in the second magnification processing unit 26, second reduction processing unit 30, and third reduction processing unit 32 such that after the original image 36 was magnified to the virtual image 38, it is reduced by averaging a plurality of pixels, thereby obtaining the target image 40 will be clarified in the following description. The process discriminating unit 16 selects the optimum process among a plurality of conversion processing functions provided for the conversion processing unit 18 on the basis of the designated parameters (K, D, S) and allows the selected converting process to be executed. As for a processing discrimination which is executed by the process discriminating unit 16 for the magnification processing unit 20 of the conversion processing unit 18 as targets, there are two modes of magnifying modes 1 and 2. When the magnifying mode 1 is discriminated, the process discriminating unit 16 selects the first magnification processing unit 24 so as to execute the converting process. When the magnifying mode 2 is discriminated, the process discriminating unit 16 selects the second magnification processing unit 26 so as to execute the converting process. The magnifying modes 1 and 2 are as follows.

Magnifying mode 1: The first magnification processing unit 24 is selected.
    Discriminating condition I:
        Both of the magnification ratios Kh and Kv are 2 or more.
    Discriminating condition II:
        Either one of the magnification ratios Kh and Kv is less than 2 and the resolution (D) is a high resolution of 600 dpi or more.

Magnifying mode 2: The second magnification processing unit 26 is selected.
    Discriminating condition:
        Either one of the magnification ratios Kh and Kv is less than 2 and the resolution (D) is a low resolution less than 600 dpi.

With respect to the reduction processing unit 22 of the conversion processing unit 18, the process discriminating unit 16 discriminates any one of the reducing modes 1, 2, and 3. When the reducing mode 1 is discriminated, the process discriminating unit 16 selects the first reduction processing unit 28 and allows the converting process to be executed. When the reducing mode 2 is discriminated, the process discriminating unit 16 selects the second reduction processing unit 30 and allows the converting process to be executed. When the reducing mode 3 is discriminated, the process discriminating unit 16 selects the third reduction processing unit 32 and allows the converting process to be executed. The reducing modes 1 to 3 by the process discriminating unit 16 for the reduction processing unit 22 as a target are as follows.

Reducing mode 1: The first reduction processing unit 28 is selected.
    Discriminating condition <1>:
        The resolution (D) is a high resolution of 600 dpi or more.
    Discriminating condition <2>:
        The resolution (D) is a low resolution less than 600 dpi and the image size (S) is so large to be (2000×2000) dots or more.

Reducing mode 2: The second reduction processing unit 30 is selected.
    Discriminating condition:
        The resolution (D) is a middle resolution which is less than 600 dpi and is equal to or larger than 300 dpi and the image size (S) is small to be less than (2000×2000) dots.

Reducing mode 3: The third reduction processing unit 32 is selected.
    Discriminating condition:
        The resolution (D) is a low resolution less than 300 dpi and the image size (S) is small to be less than (2000×2000) dots.

Figure 7B:
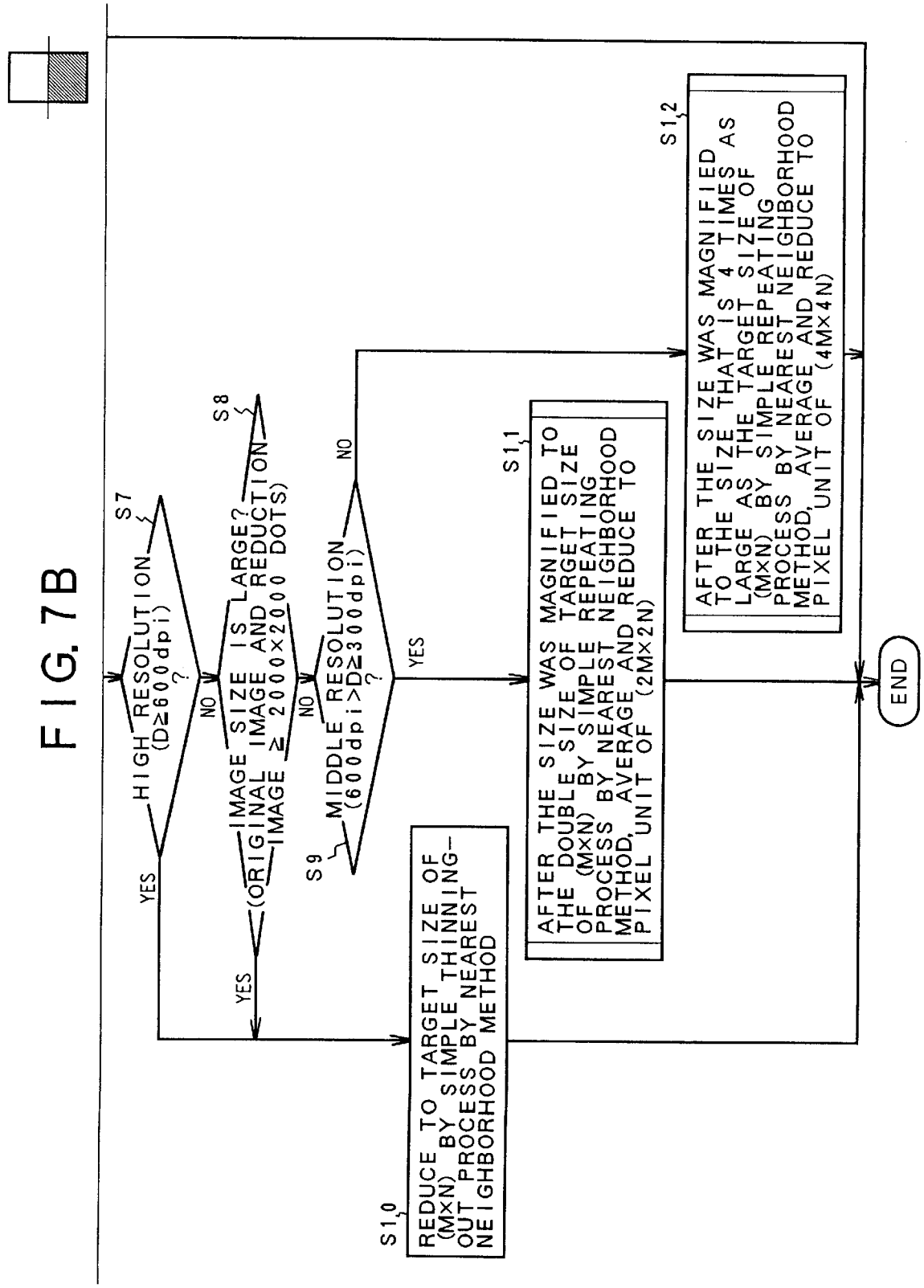

FIGS. 7A and 7B are flowcharts for a converting process from the original image 36 to the target image 40 by the conversion processing unit 18 based on the process discriminating unit 16 in FIG. 6. First in step S1, the size (P×Q) dots of the original image, the magnification (K=Kh, Kv) of the target image, the size (M×N) dots of the target image, and the resolution Ddpi are read. In step S2, the magnification (K) of the target image, namely, the horizontal magnification Kh and vertical magnification Kv are discriminated. When either one of them exceeds 1, it is determined that the magnification is performed. A magnifying process in steps S3 to S6 is executed. On the other hand, when either the magnification Kh or Kv is less than 1, a reducing process in steps S7 to S12 is executed. In the magnifying process, a check is made in step S3 to see if the magnification ratio (K) is less than 2. Specifically speaking, a check is made to see whether either one of the horizontal and vertical magnifications Kh and Kv is less than 2 or not. When both of the horizontal and vertical magnifications Kh and Kv are equal to 2 or more, this case corresponds to the foregoing magnifying mode 1. The processing routine advances to step S6. The original image is magnified to (M×N) dots as a size of target image by the first magnification processing unit 24 by an interpolating process due to the simple repetition based on the nearest neighborhood method. When both of or either one of the horizontal and vertical magnifications Kh and Kv are less than 2 in step S3, a check is made in step S4 to see if the resolution is high. In the discrimination about the high resolution, in case of the color printing apparatus in FIG. 2, when the resolution (D) is equal to or larger than 600 dpi, the resolution is determined to be high. When the high resolution is decided in step S4, step S6 follows. The process of the first magnification processing unit 24 corresponding to the foregoing magnifying mode 1 is selected and the original image is magnified to the size of target image by the interpolating process by the simple repetition based on the nearest neighborhood method. That is, the process directing from step S3 to step S6 corresponds to the case of the discriminating condition <1> in the foregoing magnifying mode 1. On the other hand, the process directing to step s6 via steps S3 and S4 corresponds to the process in case of the discriminating condition <2> in the magnifying mode 1. When the magnification of the target image is less than 1 in step S2, specifically speaking, when both of the horizontal and vertical magnifications Kh and Kv are less than 1 or either one of them is equal to 1 and the other is less than 1, the reducing process is determined and the processing routine advances to step S7. In step S7, a check is made to see if the resolution (D) is a high resolution of 600 dpi or more. When the resolution is determined to be high, step S10 follows. The process of the first reduction processing unit 28 in FIG. 6 is selected and the original image is reduced to the size of (M×N) dots of the target image by the simple thinning-out process based on the nearest neighborhood method. This process corresponds to the case of the discriminating condition I in the foregoing reducing mode 1. When the resolution (D) is less than 600 dpi in step S7, a check is made in step S8 to see if the image size is large. When the image sizes of both of the original image 36 and target image 40 are equal to or larger than (2000×2000) dots, the image size is determined to be large. Step S10 follows. The process of the first reduction processing unit 28 in FIG. 6 is selected and the original image is reduced to the size of target image by the simple thinning-out process based on the nearest neighborhood method. This process corresponds to the case of the discriminating condition II in the foregoing reducing mode 1. When the resolution (D) is less than 600 dpi in step S7 and when the image size of either the original image 36 or the target image 40 is less than (2000×2000) dots in step S8, a check is made in step S9 to see if the resolution (D) is a middle resolution. The middle resolution denotes a resolution in the case where it is less than 600 dpi and is equal to or larger than 300 dpi. When the middle resolution is determined, step S11 follows. The process of the second reduction processing unit 30 in FIG. 6 is selected. That is, like an image memory 34 in FIG. 6, the virtual image 38 of (2M×2N) dots obtained by doubling the number of (M×N) dots in each of the vertical and horizontal directions of the target image 40 is prepared. After the original image 36 was magnified by two times to the virtual image 38 by the nearest neighborhood method, they are averaged on a unit basis of (2M×2N) pixels of the original image 36 and one pixel of the target image 40 is obtained, thereby reducing. This corresponds to the discriminating condition of selecting the second reduction processing unit 30 by the foregoing reducing mode 2. Further in step S9, when the resolution (D) is a low resolution less than 300 dpi, step S12 follows. The process of the third reduction processing unit 32 in FIG. 5 is selected and the original image 36 is magnified to the virtual image 38. After that, it is reduced to the target image 40 by the averaging process. This corresponds to the selection of the discriminating condition and the process by the foregoing reducing mode 3. The converting process by the third reduction processing unit 32 in step S12 differs with respect to a point that the size of virtual image 38 is set to the size of (4M×4N) dots which is four times as large as the target image 40 of the dots in each of the vertical and horizontal directions in case of step S11.

FIG. 8 is an explanatory diagram of a magnifying process using the nearest neighborhood method by the first magnification processing unit 24 provided in the conversion processing unit 18 in FIG. 6. FIG. 8 shows a case where the original image 36 of (4×4) dots is used as an example and this original image 36 is magnified to the target image 40 of (10×10) dots. For this purpose, both of the horizontal and vertical magnifications Kh and Kv are set to 2.5 and the process in step S6 in flowcharts of FIGS. 7A and 7B, namely, the converting process by the first magnification processing unit 24 in FIG. 6 is selected. Since this converting process is a magnification by the nearest neighborhood method, the matrix number (vertical·horizontal number) in which the simple repetition is executed in the original image 36 is calculated on the basis of the equation (1). The pixels layout such as to interpolate and magnify like a magnified target image 40 in FIG. 8 is performed.

FIG. 9 shows a jaggy of the magnified image by the nearest neighborhood method in FIG. 8 together with the original image. Eight dots showing an oblique line shown by numbers 1 to 8 in the original image 36 in FIG. 9 are arranged like pixels of the target image 40 by the interpolation due to the simple repetition of pixels by the nearest neighborhood method. However, when the magnification ratio is equal to or larger than 2, even if there is a jaggy in the magnified line of the numbers 1 to 8 of the target image 40, a jaggy portion is not conspicuous as a whole and a feeling of physical disorder is not felt.

Figure 10:
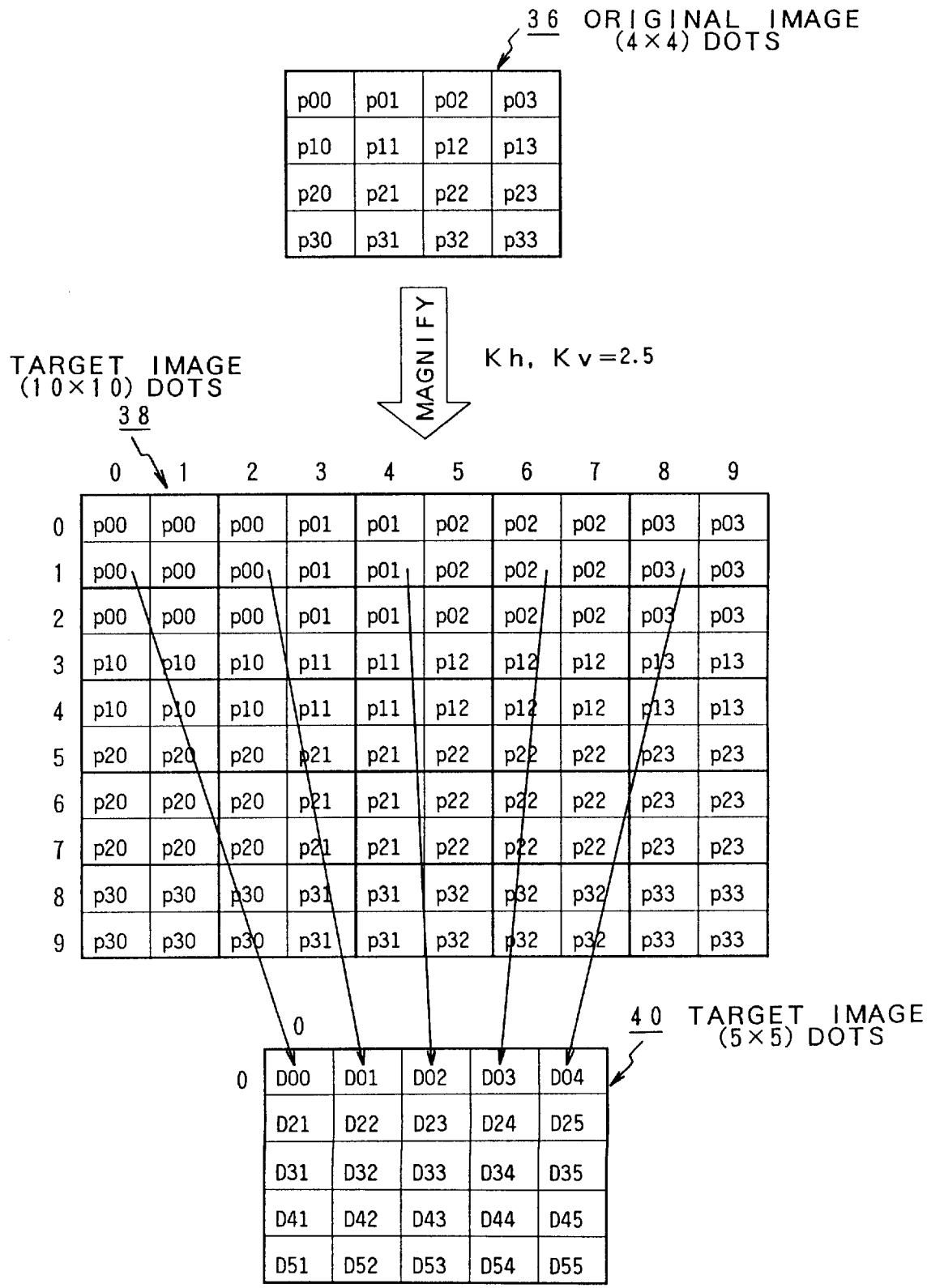
FIG. 10 is an explanatory diagram of a magnifying process by a second magnification processing unit in FIG. 6.

FIG. 10 shows the converting process by the second magnification processing unit 26 in FIG. 6 and relates to the case of magnifying the original image 36 of (4×4) dots to the target image 40 of (5×5) dots. In this case as well, both of the horizontal and vertical magnifications Kh and Kv are equal to 1.25 and under the condition such that the resolution (D) is less than 600 dpi, the process of the second magnification processing unit 26 in FIG. 6 shown in step S5 is executed.

In the magnifying process of FIG. 10, after the original image 36 was magnified to the virtual image 38 by the nearest neighborhood method, it is reduced to the target image 40 by averaging a plurality of pixels. The vertical/horizontal size of virtual image 38 in this instance is set to (10×10) dots in which the target image 40 of (5×5) dots is doubled. The original image 36 of (4×4) dots is magnified to the virtual image 38 of (10×10) dots by the nearest neighborhood method. Both of the horizontal and vertical magnifications Kh and Kv in this case are equal to 2.5. After completion of the magnification to the virtual image 38, the average is obtained every four pixels on a unit basis of (2×2) dots in the vertical and horizontal directions in the virtual image 38 and is set to one pixel of the corresponding target image 40. For example, the average value of four pixels having the pixel value P00 of the 0th and first matrices (vertical·horizontal) of the virtual image 38 is obtained. The average value is labeled as D00 and stored into the matrix No. 00 of the target image 40. That is, $$D00=(P00+P00+P00+P00)/4$$

In a manner similar to the above, the average value of the pixel gradation values is obtained and stored into the target image 40 with respect to four pixels of a unit of two pixels of the matrix with regard to the virtual image 38.

Figure 11:
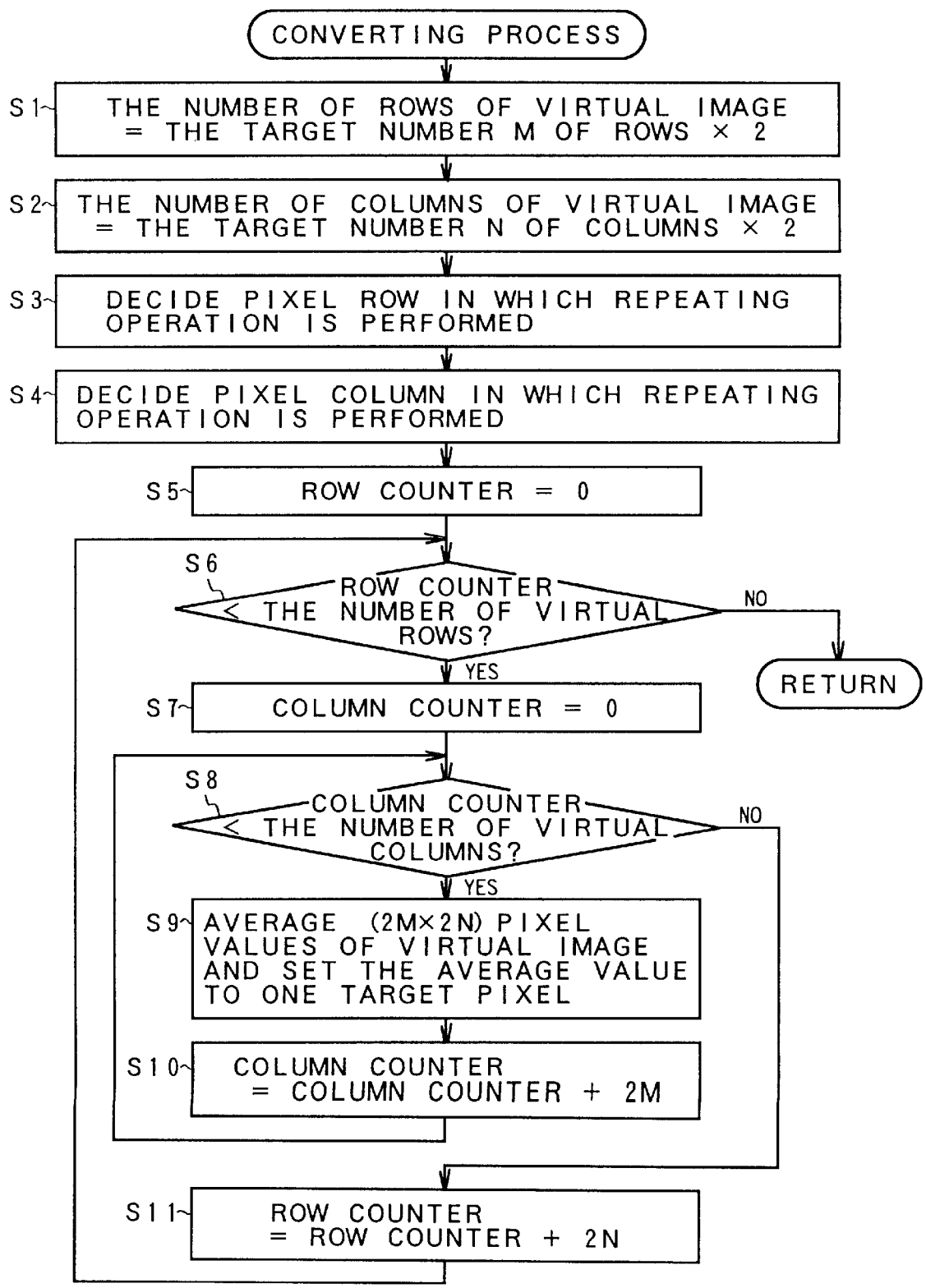
FIG. 11 is a flowchart for a converting process using a virtual image of the invention.

FIG. 11 is a flowchart for the converting process by the invention using the virtual image 38 in FIG. 10. First in step S1, the number of rows of the virtual image 38 is set to the value that is twice as large as the target number (M) of rows of the target image 40. In step S2, the number of columns of the virtual image 38 is set to the value that is twice as large as the target number (N) of columns. In step S3, the pixel row in which the thinning-out process is performed upon reduction and the repetition is executed upon magnification with respect to the original image in accordance with the equation (1) is determined. In step S4, the pixel column in which the thinning-out process is performed upon reduction and the repetition is executed upon magnification with respect to the original image is determined. In step S5, a row counter is reset to 0. After that, while a count value of the row counter is equal to the number 7 of virtual rows of the virtual image 38 in step S6, the processes in steps S7 to S11 are repeated. In step S7, a column counter is reset to 0. After that, if a count value of the column counter is less than the number of virtual columns of the virtual image, the pixel values of (2×2) of the virtual image 38 are averaged and set to one target pixel in step S9. In step S10, the count value of the column counter is increased by only 2 and until the count value of the column counter reaches the number of columns of the virtual image in step S8, the processes in steps S9 and S10 are repeated. When the count value of the column counter reaches the number of virtual columns, the count value of the row counter is increased by 2 in step S11. After that, the processing routine is returned to step S6 and similar processes are repeated until the count value of the row counter reaches the number of rows of the virtual image.

FIGS. 12A and 12B are diagrams for comparing the virtual image by only the nearest neighborhood method and the target image by the magnifying process using the virtual image of the flowchart of FIG. 11 with respect to the case where the magnification is less than 2. FIG. 12A shows the case of obtaining the target image 40 by magnifying the original image 36 by the interpolating process of the simple repetition by the nearest neighborhood method. On the other hand, FIG. 12B shows the case of obtaining the target image 40 by preparing the virtual image 38 of a size that is twice as large as the size in each of the vertical and horizontal directions of the target image 40, magnifying the original image 36 to the virtual image 38 by the nearest neighborhood method, and thereafter, obtaining the target image by the average calculation on a unit basis of (2×2) pixels. A target image 40-1 after the magnification of FIG. 12A and a target image 40-2 after the magnification of FIG. 12B are compared. In the target image 40-1 by only the nearest neighborhood method, the jaggy of the dot array serving as a magnified oblique line is conspicuous. On the other hand, in the target image 40-2 in which one target pixel is obtained by averaging after the original image was magnified to the virtual image 38, the jaggy portion is expressed by dense and light portions by the average of the peripheral pixels, so that the jaggy can be inconspicuously expressed.

FIG. 13 is an image explanatory diagram of the converting process by the first reduction processing unit 28 in FIG. 6. When the resolution (D) of the original image 36 is a high resolution of 600 dpi or more and, with respect to the original image 36 of such a high resolution, even if it is reduced by the simple thinning-out of the pixels due to the nearest neighborhood method and the target image 40 is obtained, the jaggy of the dots added with the numbers 1 to 8 showing the line in the oblique direction is not conspicuous and the resolution is high. Therefore, a drop-out of the line does not occur even in case of a thin line. On the other hand, in the reducing process by the second reduction processing unit 30 in FIG. 6, fundamentally, the conversion of FIG. 12B equivalent to that in case of the second magnification processing unit 26 in FIG. 6 can be performed. That is, although FIG. 12B relates to the magnification, with respect to the reduction as well, the number of rows and the number of columns of the virtual image in steps S1 and S2 in FIG. 11 are merely changed to the number of target rows and the number of target columns to be reduced and the processes in steps S1 to S11 are substantially the same as those mentioned above. Therefore, as for the target image 40-2 obtained by magnifying the original image 36 to the virtual image 38 and, after that, by reducing by averaging four pixels on a unit basis of (2×2) dots, the jaggy portion with respect to its oblique line is expressed by dense and light portions of the pixels and the jaggy is inconspicuous. Even in case of a thin line in the oblique direction, since the jaggy portion is expressed by the dense and light portions of the pixels, a drop-out of the thin line doesn't occur.

Figure 14:
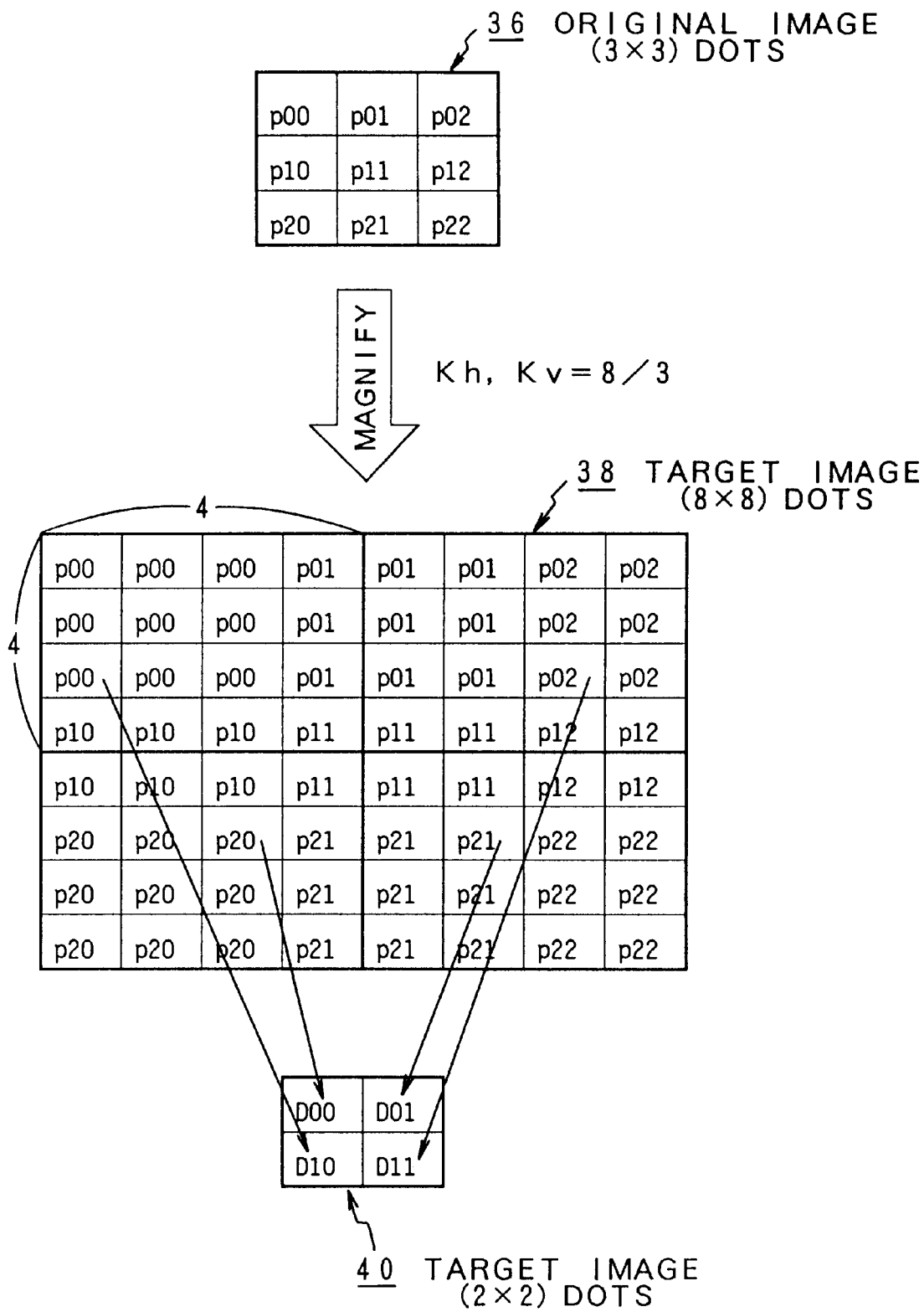
FIG. 14 is an explanatory diagram of a reducing process using a virtual image by a third reduction processing unit in FIG. 6.

FIG. 14 shows the converting process by the third reduction processing unit 32 in FIG. 6 and relates to the case of reducing the original image 36 of (3×3) dots to the target image 40 of (2×2) dots and the case where the resolution is less than 300 dpi and the image size is less than (2000×2000) dots. In the reducing process of the small image size and low resolution as mentioned above, the size of virtual image 38 is set to the size of (8×8) dots obtained by multiplying the target image 40 of (2×2) dots by four times. After the original image 36 of (3×3) dots was magnified to the virtual image 38 of (8×8) dots by the nearest neighborhood method, the gradation value of one pixel of the corresponding target image 40 is obtained and reduced by the average calculation of 16 pixels of every (4×4) dots of the matrix (vertical·horizontal) of the virtual image 38. For example, the pixel value D00 of the matrix number 00 of the target image 40 is calculated by averaging 16 pixels of the matrix numbers 0 to 3. With respect to the reducing process in the case where the image size is small and the resolution is also low, the magnification of the virtual image 38 for the target image 40 is widened from two times in case of the middle resolution to four times. With respect to the virtual image 38 widened as mentioned above, the original image 36 is magnified by the nearest neighborhood method and the average value of (4×4) pixels is set to one target pixel, thereby reducing a change in dense and light portions among the pixels in the reduced line in the target image 40. Thus, the jaggy is made inconspicuous and a drop-out of the thin line does not occur.

Figure 15:
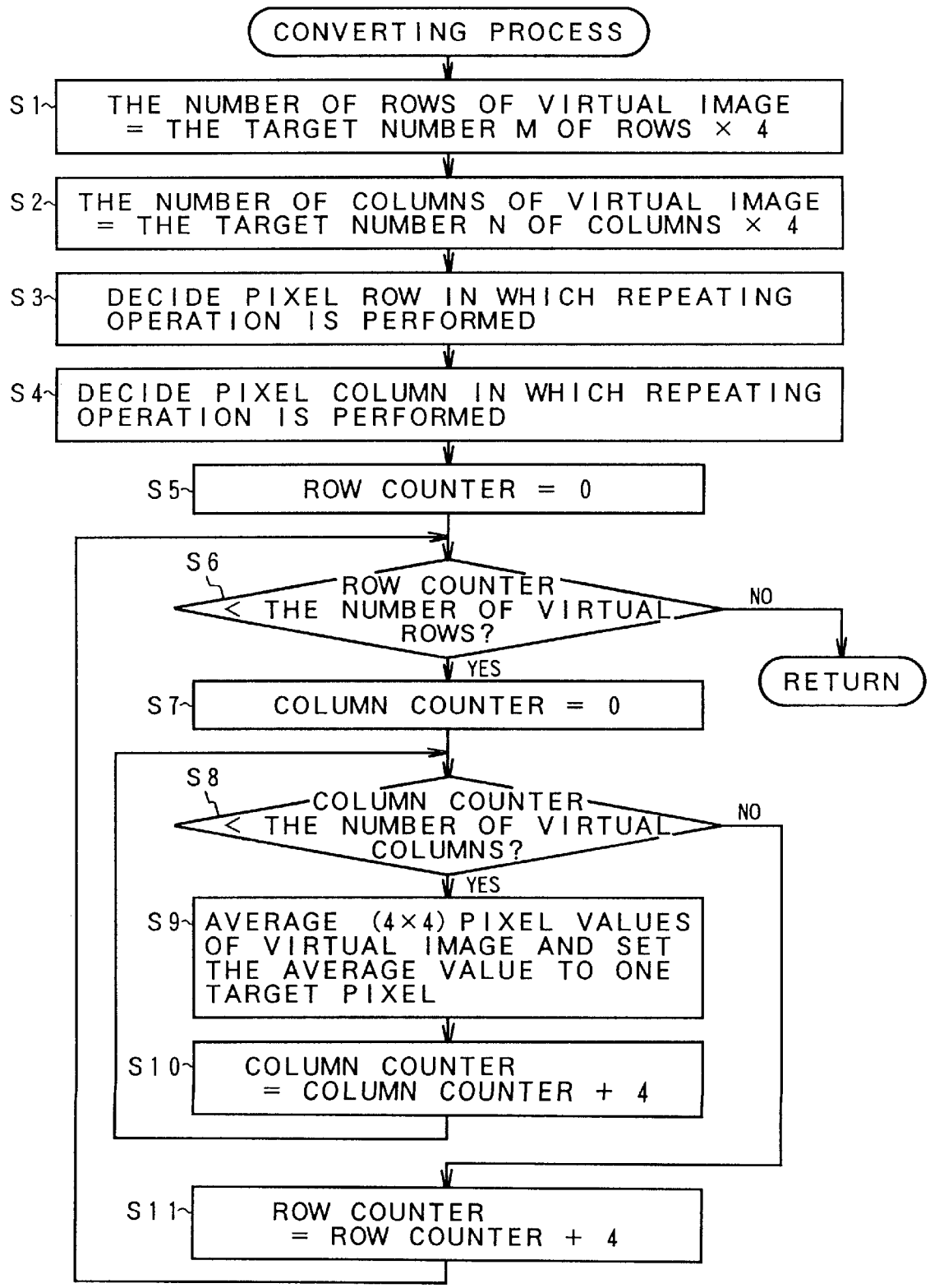
FIG. 15 is a flowchart for the reducing process using the virtual image by the third reduction processing unit in FIG. 6.

FIG. 15 is a flowchart for the reducing process in the case where the size of virtual image 38 in FIG. 14 is magnified to the size that is four times as large as the size of target image 40. FIG. 15 differs from the flowchart of FIG. 11 with respect to a point that the magnification is set to four times in each of steps S1, 2, and 9 to 11.

According to the invention as mentioned above, the magnification for enlargement or reduction, the resolution, and further, the image size as necessary are discriminated and the optimum converting process is selectively used. Particularly, the converting process such that the virtual image of the size obtained by magnifying the size of target image is prepared, the original image is magnified to the virtual image by the interpolation due to the simple repetition, and after that, one target pixel is obtained and reduced by averaging a plurality of pixels of the virtual image is added into the converting process. Thus, the virtual image or reduced image in which the jaggy (stairway) is inconspicuous in the magnified or reduced target image, a drop-out of the thin line doesn't occur with respect to the reduced image, and a deterioration in picture quality is small can be obtained while utilizing the high processing speed as an advantage of the nearest neighborhood method.

As embodiments of the recording medium in which the image size converting program has been recorded and which can be read by a computer according to the invention, there are a removable portable storage medium such as CD-ROM, floppy disk, or the like, a storage device of a program provider who provides the program via a line, and further, a memory device such as RAM, hard disk, or the like of a processing apparatus in which the program has been installed. The program provided by the recording medium is loaded into the processing apparatus and is executed on a main memory. The image size converting program stored in the recording medium has the functions shown in the blocks of FIG. 6 as program modules.

Although the above embodiment has been shown and described with respect to the example of the image size converting process for the image printing in the color printer as a target, the invention is not limited to it but can be also applied to a size conversion in proper image output apparatuses of display apparatus such as CRT, liquid crystal panel, and further, projector, and the like.

The discriminating conditions for selecting the optimum converting process in the above embodiment have been merely shown as an example. Proper discriminating conditions are used in accordance with a target apparatus for outputting an image. Further, the invention is not limited to the foregoing embodiment but includes many variations and modifications within the purview of the invention without departing from the objects of the invention. Moreover, the invention is not limited by the numerical values shown in the embodiment.

What is claimed is:

1. An image size converting apparatus comprising:
   a conversion magnification designating unit for designating a conversion magnification (K) to convert an original image having (P×Q) dots as a predetermined number of pixels in the vertical and horizontal directions into a target image of (M×N) dots as a different number of pixels in the vertical and horizontal directions;
   a resolution designating unit to designate a resolution of the target image;
   an image size designating unit to designate image sizes of the original image and the target image;
   a first magnification processing unit to magnify said original image to said target image through interpolation by simple repetition of pixels;
   a second magnification processing unit to magnify said original image to a virtual image of I(M×N) dots as the number of pixels in the vertical and horizontal directions by multiplying said (M×N)dots as the number of pixels in the vertical and horizontal directions of said target image by an integer (I) of 2 or larger when said original image is magnified to said target image and, thereafter, averaging the pixels on a unit basis of (I×I) dots as the number of pixels in the vertical and horizontal directions which coincides with said multiple (I) with respect to said virtual image, thereby calculating each pixel value of said target image;
   a first reduction processing unit to reduce said original image to said target image by simply thinning out pixels;
   a second reduction processing unit to magnify said original image to a virtual image of I(M×N) dots as the number of pixels in the vertical and horizontal directions by multiplying said (M×N) dots as the number of pixels in the vertical and horizontal directions of said target image by an integer (I) of 2 or larger when said original image is reduced to said target image and, thereafter, averaging the pixels on a unit basis of (I×I) dots as the number of pixels in the vertical and horizontal directions which coincides, with said multiple (I) with respect to said virtual image, thereby calculating each pixel value of said target image;
   a third reduction processing unit to magnify said original image to a virtual image of 2I(M×N) dots as the number of pixels in the vertical and horizontal directions by multiplying said (M×N) dots as the number of pixels in the vertical and horizontal directions of said target image by a value which is twice as large as said integer (I) of 2 or larger when said original image is reduced to said target image and, thereafter, averaging the pixels on a unit basis of 2(I×I) dots as the number of pixels in the vertical and horizontal directions which coincides with said multiple (I×2) with respect to said virtual image, thereby calculating each pixel value of said target image; and
   a process discriminating unit to select an optimum processing unit among said first magnification processing unit, said second magnification processing unit, said first reduction processing unit, said second reduction processing unit, and said third reduction processing unit on the basis of said conversion magnification, said resolution, and said image size, thereby allowing the selected processing unit to execute a converting process.

2. An apparatus according to claim 1, wherein when a conversion magnification of 2 or larger is discriminated or when a conversion magnification less than 2 and a high resolution are discriminated by said process discriminating unit, said original image is magnified to the target image by said first magnification processing unit by an interpolation due to a simple repetition of the pixels.

3. An apparatus according to claim 1, wherein when a conversion magnification less than 2 and a high resolution of 600 dpi are discriminated by said process discriminating unit, said original image is magnified to the target image by said first magnification processing unit by an interpolation due to a simple repetition of the pixels.

4. An apparatus according to claim 1, wherein when a conversion magnification less than 2 and a low resolution are discriminated by said process discriminating unit, said original image is magnified to a virtual image of 2(M×N) dots as the number of pixels in the vertical and horizontal directions by said second magnification processing unit by doubling said (M×N) dots as the number of pixels in the vertical and horizontal directions of said target image and, after that, the pixels are averaged on a unit basis of (2×2) dots as the number of pixels in the vertical and horizontal directions which coincides with said multiple 2 with respect to said virtual image, thereby calculating each pixel value of said target image.

5. An apparatus according to claim 1, wherein when a conversion magnification less than 2 and a low resolution less than 600 dpi are discriminated by said process discriminating unit, said original image is magnified to a virtual image of 2(M×N) dots as the number of pixels in the vertical and horizontal directions by said second magnification processing unit by doubling said (M×N) dots as the number of pixels in the vertical and horizontal directions of said target image and, after that, the pixels are averaged on a unit basis of (2×2) dots as the number of pixels in the vertical and horizontal directions which coincides with said multiple 2 with respect to said virtual image, thereby calculating each pixel value of said target image.

6. An apparatus according to claim 1, wherein a conversion magnification less than 1 and a high resolution are discriminated by said process discriminating unit or when a conversion magnification less than 1, a low resolution, and a fact that the sizes of said original image and said target image are large is discriminated, the original image is reduced to the target image by said first reduction processing unit by a simple thinning-out of the pixels of said original image.

7. An apparatus according to claim 1, wherein a conversion magnification less than 1 and a high resolution of 600 dpi or more are discriminated by said process discriminating unit or when a conversion magnification less than 1, a low resolution less than 600 dpi, and a large image size of (2000×2000) dots or more of said original image and said target image are discriminated, the original image is reduced to the target image by said first reduction processing unit by a simple thinning-out of the pixels of said original image.

8. An apparatus according to claim 1, wherein a conversion magnification less than 1, a middle resolution, and a small image size are discriminated by said process discriminating unit, said original image is magnified to a virtual image of 2(M×N) dots as the number of pixels in the vertical and horizontal directions by said second reduction processing unit by doubling said (M×N) dots as the number of pixels in the vertical and horizontal directions of said target image and, after that, the pixels are averaged on a unit basis of (2×2) dots as the number of pixels in the vertical and horizontal directions which coincides with said multiple 2 with respect to said virtual image, thereby calculating each pixel value of said target image.

9. An apparatus according to claim 1, wherein a conversion magnification less than 1, a middle resolution which is less than 600 dpi and is equal to or larger than 300 dpi, and a small image size less than (2000×2000) dots are discriminated by said process discriminating unit, said original image is magnified to a virtual image of 2(M×N) dots as the number of pixels in the vertical and horizontal directions by said second reduction processing unit by doubling said (M×N) dots as the number of pixels in the vertical and horizontal directions of said target image and, after that, the pixels are averaged on a unit basis of (2×2) dots as the number of pixels in the vertical and horizontal directions which coincides with said multiple 2 with respect to said virtual image, thereby calculating each pixel value of said target image.

10. An apparatus according to claim 1, wherein a conversion magnification less than 1, a low resolution, and a small image size are discriminated by said process discriminating unit, said original image is magnified to a virtual image of 4(M×N) dots as the number of pixels in the vertical and horizontal directions by said third reduction processing unit by multiplying said (M×N) dots as the number of pixels in the vertical and horizontal directions of said target image by 4 and, after that, the pixels are averaged on a unit basis of (4×4) dots as the number of pixels in the vertical and horizontal directions which coincides with said multiple (2×2) with respect to said virtual image, thereby calculating each pixel value of said target image.

11. An apparatus according to claim 1, wherein a conversion magnification less than 1, a low resolution less than 300 dpi, and a small image size less than (2000×2000) dots are discriminated by said process discriminating unit, said original image is magnified to a virtual image of 4(M×N) dots as the number of pixels in the vertical and horizontal directions by said third reduction processing unit by multiplying said (M×N) dots as the number of pixels in the vertical and horizontal directions of said target image by 4 and, after that, the pixels are averaged on a unit basis of (4×4) dots as the number of pixels in the vertical and horizontal directions which coincides with said multiple (2×2) with respect to said virtual image, thereby calculating each pixel value of said target image.

12. An apparatus according to claim 1, wherein the conversion from the original image to the target image in each of said first magnification processing unit and said first reduction processing unit and the conversion from the original image to the virtual image in each of said second magnification processing unit, said second reduction processing unit, and said third reduction processing unit are executed by an algorithm of a nearest neighborhood method.

13. An image size converting method comprising:
a conversion magnification designating step of designating a conversion magnification (K) to convert an original image having (P×Q) dots as a predetermined number of pixels in the vertical and horizontal directions into a target image of (M×N) dots as a different number of pixels in the vertical and horizontal directions;
a resolution designating step of designating a resolution of the target image;
an image size designating step of designating image sizes of the original image and the target image;
a first magnification processing step of magnifying said original image to said target image through interpolation by simple repetition of pixels;
a second magnification processing step of magnifying said original image to a virtual image of I(M×N) dots as the number of pixels in the vertical and horizontal directions by multiplying said (M×N) dots as the number of pixels in the vertical and horizontal directions of said target image by an integer (I) of 2 or larger when said original image is magnified to said target image and, thereafter, averaging the pixels on a unit basis of (I×I) dots as the number of pixels in the vertical and horizontal directions which coincides with said multiple (I) with respect to said virtual image, thereby calculating each pixel value of said target image;
a first reduction processing step of reducing said original image to said target image by simply thinning out pixels;
a second reduction processing step of magnifying said original image to a virtual image of I(M×N) dots, as the number of pixels in the vertical and horizontal directions by multiplying said (M×N) dots as the number of pixels in the vertical and horizontal directions of said target image by an integer (I) of 2 or larger when said original image is reduced to said target image and, thereafter, averaging the pixels on a unit basis of (I×I) dots as the number of pixels in the vertical and horizontal directions which coincides with said multiple (I) with respect to said virtual image, thereby calculating each pixel value of said target image;
a third reduction processing step of magnifying said original image to a virtual image of 2I(M×N) dots as the number of pixels in the vertical and horizontal directions by multiplying said (M×N) dots as the number of pixels in the vertical and horizontal directions of said target image by a value which is twice as large as said integer (I) of 2 or larger when said original image is reduced to said target image and, thereafter, averaging the pixels on a unit basis of 2(I×I) dots as the number of pixels in the vertical and horizontal directions which coincides with said multiple (I×2) with respect to said virtual image, thereby calculating each pixel value of said target image; and
a process discriminating step of selecting an optimum processing step among said first magnification processing step, said second magnification processing step, said first reduction processing step, said second reduction processing step, and said third reduction processing step on the basis of said conversion magnification, said resolution, and said image size, thereby allowing the selected processing step to execute a converting process.

14. A recording medium in which an image size converting program has been recorded and which can be read out by a computer, comprising:

a conversion magnification designating module for designating a conversion magnification (K) to convert an original image having (P×Q) dots as a predetermined number of pixels in the vertical and horizontal directions into a target image of (M×N) dots as a different number of pixels in the vertical and horizontal directions;

a resolution designating module for designating a resolution of the target image;

an image size designating module for designating image sizes of the original image and the target image;

a first magnification processing module for magnifying said original image to said target image through interpolation by simple repetition of pixels;

a second magnification processing module for magnifying said original image to a virtual image of I(M×N) dots as the number of pixels in the vertical and horizontal directions by multiplying said (M×N) dots as the number of pixels in the vertical and horizontal directions of said target image by an integer (I) of 2 or larger when said original image is magnified to said target image and, thereafter, averaging the pixels on a unit basis of (I×I) dots as the number of pixels in the vertical and horizontal directions which coincides with said multiple (I) with respect to said virtual image, thereby calculating each pixel value of said target image;

a first reduction processing module for reducing said original image to said target image by simply thinning out pixels;

a second reduction processing module for magnifying said original image to a virtual image of I(M×N) dots as the number of pixels in the vertical and horizontal directions by multiplying said (M×N) dots as the number of pixels in the vertical and horizontal directions of said target image by an integer (I) of 2 or larger when said original image is reduced to said target image and, thereafter, averaging the pixels on a unit basis of (I×I) dots as the number of pixels in the vertical and horizontal directions which coincides with said multiple (I) with respect to said virtual image, thereby calculating each pixel value of said target image;

a third reduction processing module for magnifying said original image to a virtual image of 2I(M×N) dots as the number of pixels in the vertical and horizontal directions by multiplying said (M×N) dots as the number of pixels in the vertical and horizontal directions of said target image by a value which is twice as large as said integer (I) of 2 or larger when said original image is reduced to said target image and, thereafter, averaging the pixels on a unit basis of 2(I×I) dots as the number of pixels in the vertical and horizontal directions which coincides with, said multiple (I×2) with respect to said virtual image, thereby calculating each pixel value of said target image; and a process discriminating module for selecting an optimum processing module among said first magnification processing module, said second magnification processing module, said first reduction processing module, said second reduction processing module, and said third reduction processing module on the basis of said conversion magnification, said resolution, and said image size, thereby allowing the selected processing module to execute a converting process.

* * * * *